(12) United States Patent
Gulwani et al.

(10) Patent No.: US 8,799,234 B2
(45) Date of Patent: Aug. 5, 2014

(54) SEMANTIC ENTITY MANIPULATION USING INPUT-OUTPUT EXAMPLES

(75) Inventors: Sumit Gulwani, Redmond, WA (US); Rishabh Singh, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 773 days.

(21) Appl. No.: 13/020,153

(22) Filed: Feb. 3, 2011

(65) Prior Publication Data

US 2012/0011084 A1 Jan. 12, 2012

Related U.S. Application Data

(63) Continuation-in-part of application No. 12/834,031, filed on Jul. 12, 2010.

(51) Int. Cl.
*G06F 17/30* (2006.01)

(52) U.S. Cl.
USPC ........... 707/687; 707/692; 707/697; 707/736; 707/781

(58) Field of Classification Search
USPC .................... 707/687, 692, 697, 736, 781
See application file for complete search history.

(56) References Cited

U.S. PATENT DOCUMENTS

| | | | |
|---|---|---|---|
| 5,790,760 | A | 8/1998 | Arima |
| 6,963,871 | B1 * | 11/2005 | Hermansen et al. ................ 1/1 |
| 2008/0282108 | A1 | 11/2008 | Jojic et al. |
| 2009/0119416 | A1 * | 5/2009 | Sirdevan et al. ............. 709/246 |

OTHER PUBLICATIONS

Elhadi, et al., "Use of Text Syntactical Structures in Detection of Document Duplicates", Retrieved at << http://ieeexplore.ieee.org/stamp/stamp.jsp?tp=&arnumber=4746719 >>, Third International Conference on Digital Information Management, Nov. 13-16, 2008, pp. 520-525.

Cypher, Allen, "Eager: Programming Repetitive Tasks by Example", Retrieved at << http://citeseerx.ist.psu.edu/viewdoc/download;jsessionid=5F31C0F2A851FAE41EF9F0E1B4F750B9?doi=10.1.1.35.2047&rep=rep1&type=pdf >>, Proceedings of the SIGCHI conference on Human factors in computing systems, Apr. 28-May 2, 1991, pp. 9.

Zhang, et al., "Editable Replay of IDE-based Repetitive Tasks", Retrieved at << http://sei.pku.edu.cn/~zhangying06/publications/Compsac08-SmartReplayer.pdf >>, 32nd Annual IEEE International Computer Software and Applications Conference, Jul. 28-Aug. 1, 2008, pp. 473-480.

(Continued)

*Primary Examiner* — Sana Al Hashemi
(74) *Attorney, Agent, or Firm* — Dan Choi; Carole Boelitz; Micky Minhas

(57) ABSTRACT

Semantic entity manipulation technique embodiments are presented that generate a probabilistic program capable of manipulating character strings representing semantic entities based on input-output examples. The program can then be used to produce a desired output consistent with the input-output examples from inputs of a type included in the examples. The probabilistic program is generated based on the output of parsing, transform and formatting modules. The parsing module employs a probabilistic approach to parsing the input-output examples. The transform module identifies a weighted set of transforms that are capable of producing the output item from the input items of an input-output example to a likelihood specified by their assigned weight. The formatting module generates formatting instructions that transform selected output parts into a form specified by the output items in the input-output examples.

20 Claims, 14 Drawing Sheets

(56) References Cited

OTHER PUBLICATIONS

Gong, et al., "Automating Microsoft Office Word in Visual Basic", Retrieved at << http://ieeexplore.ieee.org/stamp/stamp.jsp?tp=&arnumber=5209821 >>, Second International Symposium on Electronic Commerce and Security, 2009, pp. 93-97.

Lau, et al., "Learning Repetitive Text-editing Procedures with SMARTedit", Retrieved at << http://www.cs.washington.edu/homes/pedrod/papers/ywimc.html >>, in Lieberman, ed., Your Wish is My Command: Giving Users the Power to Instruct their Software, Morgan Kaufmann, Mar. 21, 2001, pp. 209-225.

Gulwani, S.,"Generating Text Manipulation Programs Using Input-Output Examples", U.S. Appl. No. 12/793,700, filed on Jun. 4, 2010, pp. 52.

Chaudhuri, et al., "Smooth interpretation", Retrieved at << http://people.csail.mit.edu/asolar/papers/pldi276-chaudhuri.pdf >>, Proceedings of the 2010 ACM SIGPLAN conference on Programming language design and implementation, vol. 45, Issue 06, Jun. 5-10, 2010, pp. 13.

Fisher, et al., "PADS: a domain-specific language for processing ad hoc data", Retrieved at << http://www.padsproj.org/papers/pldi.pdf>>, Proceedings of the 2005 ACM SIGPLAN conference on Programming language design and implementation, vol. 40, Issue 06, Jun. 2005, pp. 10.

Fisher, et al., "The next 700 data description languages", Retrieved at << http://citeseerx.ist.psu.edu/viewdoc/download?doi=10.1.1.139.4909&rep=rep1&type=pdf >>, Conference record of the 33rd ACM SIGPLAN-SIGACT symposium on Principles of programming languages, vol. 41, Issue 01, Jan. 11-13, 2006, pp. 14.

Fisher, et al., "From dirt to shovels: fully automatic tool generation from ad hoc data", Retrieved at << http://www.padsproj.org/papers/popl08.pdf >>, Proceedings of the 35th annual ACM SIGPLAN-SIGACT symposium on Principles of programming languages, vol. 14, Issue 01, Jan. 7-12, 2008, pp. 14.

Gulwani, Sumit, "Dimensions in program synthesis", Retrieved at << http://research.microsoft.com/en-us/um/people/sumitg/pubs/ppdp10-synthesis.pdf>>, Proceedings of the 12th international ACM SIGPLAN symposium on Principles and practice of declarative programming, 2010, pp. 12.

Gulwani, Sumit, "Automating string processing in spreadsheets using inputoutput examples", Retrieved at << http://research.microsoft.com/en-us/um/people/sumitg/pubs/popl11-synthesis.pdf >>, Proceedings of the 38th annual ACM SIGPLAN-SIGACT symposium on Principles of programming languages, vol. 46, Issue 01, Jan. 26-28, 2011, pp. 13.

Kuncak, et al., "Complete functional synthesis", Retrieved at << http://icwww.epfl.ch/~piskac/publications/KuncakETAL10CompleteFunctionalSynthesis.pdf >>, Proceedings of the 2010 ACM SIGPLAN conference on Programming language design and implementation, vol. 46, issue 06, Jun. 5-10, 2010, pp. 14.

Lau, Tessa, "Why PBD systems fail: Lessons learned for usable AI", Retrieved at << http://citeseerx.ist.psu.edu/viewdoc/download;jsessionid=FEE7F6F1207F0C9BA601E6781E1EC7E3?doi=10.1.1.145.208&rep=rep1&type=pdf >>, In CHI 2008 Workshop on Usable AI, 2008, pp. 4.

Lau, et al., "Programming by Demonstration using Version Space Algebra", Retrieved at << http://www.cs.indiana.edu/~scodial/b552/fulltext.pdf >>, Programming by demonstration using version space algebra. Machine Learning, vol. 53, Issue 01-02, Oct.-Nov. 2003, pp. 46.

Miller, et al., "Interactive simultaneous editing of multiple text regions", Retrieved at << http://groups.csail.mit.edu/uid/projects/simuledit/usenix01.pdf >>, Proceedings of the General Track: 2002 USENIX Annual Technical Conference, Jun. 2001, pp. 15.

Nix, Robert P., "Editing by example", Proceedings of the 11th ACM SIGACT-SIGPLAN symposium on Principles of programming languages , vol. 07, Issue 04, Oct. 1985.

Solar-Lezama, et al., "Sketching stencils", Retrieved at << http://www.cs.berkeley.edu/~bodik/research/pldi07-sketching-stencils.pdf >>, Proceedings of the 2007 ACM SIGPLAN conference on Programming language design and implementation, vol. 42, Issue 06, Jun. 11-13, 2007, pp. 12.

Srivastava, et al., "From Program Verification to Program Synthesis", Retrieved at http://research.microsoft.com/en-us/um/people/sumitg/pubs/popl10_synthesis.pdf >>, Proceedings of the 37th ACM SIGACT-SIGPLAN Symposium on Principles of Programming Languages, Jan. 17-23, 2010, pp. 14.

Xi, et al., "A Context-free Markup Language for Semi-structured Text", Retrieved at << https://www.cs.princeton.edu/~dpw/papers/anne-pldi10.pdf >>, Proceedings of the 2010 ACM SIGPLAN conference on Programming language design and implementation, vol. 45, Issue 06, Jun. 5-10, 2010, pp. 12.

* cited by examiner

| roundOff ($e, z, k, f$, Mode) |
| --- |
| Input: $e$: entity instance, $(k, f)$-roundoff, |
| Mode = {lower, upper, nearest} |
| Output: $e'$ : rounded off entity |
| 1: $PF = k * c_f$ |
| 2: $q = \dfrac{NM(e) - z}{PF}$ |
| 3: $r = NM(e) - (PF)$ |
| 4: $L_e$ = getEntity($q * PF + z$) |
| 5: $U_e$ = getEntity($(q + 1) * PF + z$) |
| 6: if Mode = lower then |
| 7:      return $L_e$ |
| 8: else if Mode = upper then |
| 9:      return $U_e$ |
| 10: else if Mode = nearest then |
| 11:     if $r < PF/2$ then |
| 12:           return $L_e$ |
| 13:     else |
| 14:           return $U_e$ |
| 15:     end if |
| 16: end if |

FIG. 8

| Double Formatting | | | |
|---|---|---|---|
| Input | Excel/C# Format | Output | Description |
| 123.4567 123.4 | 0.00 | 123.46 123.40 | two decimal places |
| 123.4567 123.4 | 0.## | 123.46 123.4 | at most two decimal places |
| 123.4567 3.4 | 00.00 | 123.46 03.40 | at least two integer digits |
| 123.4567 3.4 | #.00 | 123.46 3.40 | any integer digits |
| 12345.67 1234 | 0,0 | 12,346 1,234 | thousands separator |
| 1.2 12.34 | 0a.b0 | 1a.b2 12a.b3 | arbitrary text |

FIG. 11

| Date Formatting | | |
|---|---|---|
| Excel/C# Format | Output | Description |
| y yy yyy yyyy | 6 86 986 1986 | year |
| M MM MMM MMMM | 9 09 Sep September | month |
| d dd ddd dddd | 24 24 Wed Wednesday | day |
| h hh hhh hhhh | 6 06 18 18 | hour |
| m mm | 23 23 | minutes |
| s ss | 5 05 | seconds |
| t tt | P PM | A.M or P.M. |
| MM/dd/yyyy | 09/24/1986 | custom format |
| ddd, MMMM d, yyyy | Wed, September 24, 1986 | |
| d | 9/24/1986 | ShortDate |
| D | Wednesday, September 24, 1986 | LongDate |
| F | Wednesday, September 24, 1986 6:23:05 PM | FullDate |
| g | 9/24/1986 6:23 PM | General |
| M | September 24 | MonthDay |
| R | Wed, 24 Sep 1986 12:53:05 GMT | RFC1123 |
| t | 6:23 PM | ShortTime |
| Y | September, 1986 | YearMonth |

FIG. 12

| Input C1 | Output |
|---|---|
| 6/3/2008 | *Jun 3rd, 2008* |
| 7/26 | *Jul 26th, 2010* |
| 3.4 | Apr 3rd, 2010 |
| 23.4 | Apr 23rd, 2010 |
| 25.3.2007 | Mar 25th, 2007 |
| 2.5.2008 | May 2nd, 2008 |
| '09-Fabruary-1 | Feb 1st, 2009 |

FIG. 13

SEMANTIC ENTITY MANIPULATION USING INPUT-OUTPUT EXAMPLES

CROSS-REFERENCE TO RELATED APPLICATIONS

This application is a continuation-in-part of a prior application entitled "Generating Programs Based on Input-Output Examples Using Converter Modules" which was assigned Ser. No. 12/834,031 and filed Jul. 12, 2010.

BACKGROUND

Millions of people worldwide use spreadsheets, and the like, for storing and manipulating data. These data manipulation scenarios often involve converting a large quantity of input information from one format to another format, or entail performing computations on the input information to produce a desired output. Typically, these tasks are accomplished manually or with the use of small, often one-off, applications that are either created by the end-user or by a programmer for the end-user.

SUMMARY

Semantic entity manipulation technique embodiments described herein generate a probabilistic program capable of manipulating character strings representing semantic entities based on input-output examples. The program can then be used to produce a desired output consistent with the input-output examples from inputs of a type included in the examples. This allows input information to be converted from one format to another format, and computations to be performed on the input information to produce a desired output, based on input-output examples provided by an end-user.

In general, the foregoing can be achieved in one implementation by first receiving the aforementioned input-output examples. Each input-output example provides one or more input items and a corresponding desired output item. The received input and output items are parsed to produce a weighted set of parses. Each of these weighted parses represents a different potential parsing of each input and output item, weighted in accordance with a measure of the likelihood the parsing is a valid parsing based on a comparison to a prescribed library of parses. Next, for each input-output example, one or more transforms are identified from a library of transforms of a type that can produce the desired output item from the input items of the example. In addition, formatting instructions that are capable of formatting an output item so as to match the formatting of the desired output item of the input-output examples are identified. When all the input-output examples have been processed, a probabilistic program is generated, which when given one or more input items of the same type as the input items of the input-output examples, employs the identified transforms and the formatting instructions, to produce an output item corresponding to the one or more input items. One or more input items of the same type as the input items of the input-output examples are then received, and an output item is produced using the generated probabilistic program.

It is noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

FIG. 8 shows a rounding-off transform procedure that can be employed to round-off a semantic entity instance.

FIG. 11 shows a table of format-strings used to format a double value into various output formats.

FIG. 12 shows a table of format-strings used to format the date-time 24/9/1986 18:23:05 into various output formats.

FIG. 13 shows a spreadsheet with dates in three different formats (i.e., US format: Month/Day/Year, European format: Day.Month.Year, and Chinese format: Year-Month-Day). It is noted that some of these dates are missing the year, which is supposed to default to the current year.

DETAILED DESCRIPTION

Figure 1:
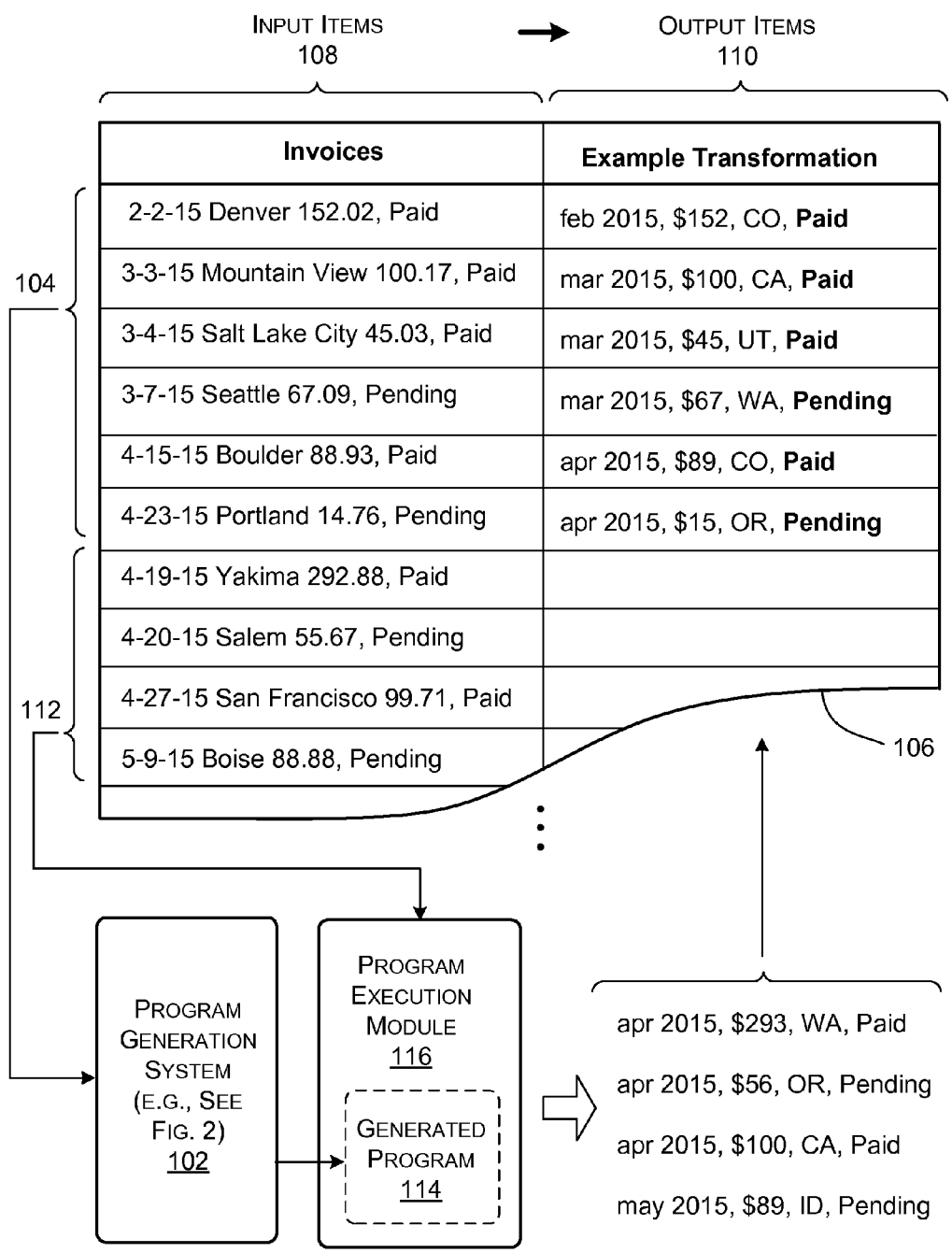
FIG. 1 shows a program generation system for generating a program that performs a data manipulation task based on input-output examples, together with a program execution module which applies the program to new input items.

In the following description of semantic entity manipulation technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

In addition, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

As to terminology, the phrase "configured to" encompasses any way that any kind of functionality can be constructed to perform an identified operation. The terms "logic" or "logic component" encompass any functionality for performing a task. For instance, each operation illustrated in the flowcharts corresponds to a logic component for performing that operation. When implemented by a computing system (e.g., "computing functionality"), a logic component represents a physical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

1.0 Overview and Relationship to the Parent Patent Application

In the previously identified parent application to this continuation-in-part application, a program generation system was described that generates a program based on plural input-output examples. The input-output examples include input items and corresponding output items. In one implementation, this program generation system includes three component modules. A parsing module processes the input items and output items to provide a plurality of input parts and output parts, respectively. A transformation module determines, for each output part, whether the output part can be produced from a corresponding input part using one or more converter modules selected from a collection of candidate converter modules. A formatting module generates formatting instructions that transform selected output parts into a form specified by the original output items. These three modules yield a generated program that embodies logic learned from the input-output examples; the generated program can be subsequently used to transform new input items into new respective output items.

In order to better understand the semantic entity manipulation technique embodiments described herein, a review of the system described in the previously-identified parent application will be presented first, and then the modifications thereto representing the semantic entity manipulation technique embodiments will be presented.

1.1 The Parent Patent Application System

FIG. 1 shows an illustrative program generation system 102 for creating a program based on input-output examples. Each input-output example includes an input item and a corresponding output item. The input item may include one or more component parts, referred to herein as input parts. The output item may also include one or more component parts, referred to as output parts.

Each output item represents some type of transformation performed on a corresponding input item. For example, an output item may include one or more output parts which represent direct copies of one or more corresponding input parts taken from the input item. In addition, or alternatively, an output item may include one or more output parts which represent transformations (not direct copies) of one or more corresponding input parts. In addition, or alternatively, an output item can include formatting applied to its content that differs from the formatting applied to the corresponding input item. In addition, or alternatively, an output item can include one or more output parts which have no counterpart parts within the corresponding input item. In addition, or alternatively, an output item need not include a counterpart part for every input part in the corresponding input item.

For example, FIG. 1 presents an illustrative set of input-output examples 104 within a data file 106. The set of input-output examples 104 includes a plurality of input items 108 and a corresponding plurality of output items 110. In this example, the input items comprise a single column of alphanumeric input information; likewise, the output items 110 comprise a single column of alphanumeric output information. However, in other cases, a data file 106 can include a single column of input information which maps to two or more columns of output information. In another case, the data file 106 can include two more columns of input information which maps to a single column of output information. In another case, the data file 106 can include two or more columns of input information which maps to two or more columns of output information, and so on. Further, a data file 106 can organize sets of input information and output information in any manner (that is, besides, or in addition to, a columnar organization). More generally stated, the example shown in FIG. 1 can be varied in many different ways.

In the particular scenario of FIG. 1, the input items represent invoices in an original format. The output items represent a transformed version of the invoices in an output format. For example, the first input item includes a date in a particular format ("2-2-15"), representing a date of Feb. 2, 2015. The output item transforms this date to another format, that is, by printing an abbreviation of the month name (i.e., "Feb."). In addition, the output item transforms the first character of the month abbreviation from uppercase to lowercase, to thereby yield "feb." The first input item also includes a name of a city, namely "Denver." The output item transforms this city information into corresponding abbreviated state information, namely "CO." The first input item also includes a cost value in dollars, namely "152.02." The output item repeats this cost value, but rounds the value off to the nearest dollar amount, yielding "152." The first input item also includes a string "Paid." The output item repeats this string in verbatim fashion.

Further note that the output item (for the first input-output example) includes additional information that is not present in the corresponding input item. For example, the output item includes three commas, whereas the input item only includes a single comma. Further, the output item adds a dollar sign "$" in front of the cost figure "152." Further, the output item arranges information in a different manner compared to the corresponding input item. For example, the input item places the location information ("Denver") prior to the cost information ("152.02"), whereas the output item places the cost information ("152") before the location information ("CO"). Finally, the output item renders the last string ("Paid") in boldface, whereas it is not presented in boldface in the input item. As can be appreciated, this particular example is presented merely for explanation purposes. Other input-output examples can vary from this scenario in any manner.

The data file 106 also includes another set of untransformed input items 112 that do not yet have corresponding output items. For small data sets, the user may study the set of input-output examples 104 to discover the logic that is being used to transform input items to corresponding output items. The user may then manually generate new output items for the set of new input items 112 which conform to this logic. However, this manual operation becomes impractical as the size of the data file 106 increases.

To address this issue, the program generation system 102 automatically generates a program 114 that assists the user in transforming the set of input items 112 into a desired output form. From a high level perspective, the program generation system 102 generates the program 114 based on the set of input-output examples 104. A program execution module 116 then applies the program 114 to the set of new input items 112. This yields a set of new output items. For example, the program 114 automatically transforms the new input item "4-19-15 Yakima 292.88, Paid" to "apr 2015, $293, WA, Paid."

Figure 2:
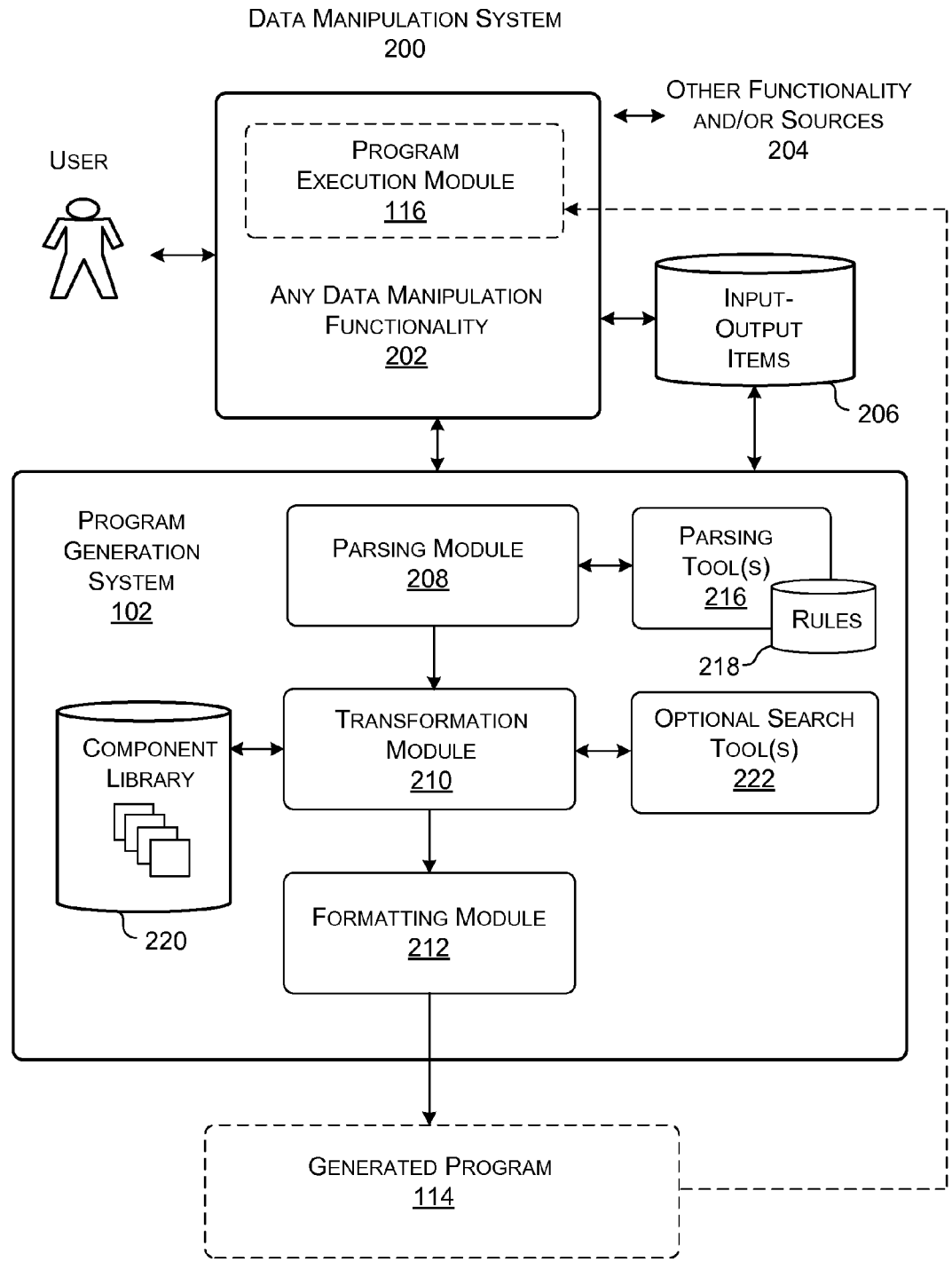
FIG. 2 shows a data manipulation system that includes the program generation system and program execution module of FIG. 1.

FIG. 2 shows one illustrative data manipulation system 200 that can make use of the program generation system 102 and the program execution module 116 of FIG. 1. Generally, FIG. 2 demarcates different modules to clearly identify the functions performed by these respective modules. In one case, these modules may represent different physical components. In other cases, one or more of the modules may represent components within one or more other modules.

From a high-level perspective, the program generation system 102 operates in conjunction with any type of data manipulation functionality 202. The data manipulation functionality 202 represents any tool for performing processing on data items. In one case, the data manipulation functionality 202 may provide a user interface which allows a user to inspect and modify the data items. For example, in one case, the data manipulation functionality 202 may represent a spreadsheet system that allows a user to manipulate data items in tabular form. One spreadsheet system that can be used is Microsoft Office Excel® provided by Microsoft® Corporation of Redmond, Wash. In another case, the data manipulation functionality 202 may represent table manipulation functionality within a document editing application, and so on.

The data manipulation functionality 202 may interact with other functionality 204. For example, the data manipulation functionality 202 may receive data items from the other functionality 204, or send data items to the other functionality 204. The other functionality 204 may represent an application module of any type (such as a document editing application, a spreadsheet application, and so on). Alternatively, or in addition, the other functionality 204 may represent a network-accessible entity of any type. For example, the other functionality 204 may represent a collection of data items maintained in a remote data store, accessible via the Internet.

In operation, the user may feed a collection of input-output examples to the data manipulation functionality 202. For example, in one case, the user may manually create a set of input-output examples. In another case, the user may instruct the data manipulation functionality 202 to read in a data file that contains the input-output examples. The data file can be obtained from any source, such as the other functionality 204, which may represent a local source and/or a remote source (with respect to the data manipulation functionality 202). Upon instruction, the data manipulation functionality 202 can use the program generation system 102 to provide a program 114. That program 114 expresses the logic embodied in the input-output examples. The program execution module 116 can then use the program 114 to automatically process new input items to generate new output items.

FIG. 2 shows the data manipulation functionality 202 and program generation system 102 as two distinct respective modules. In another case, the data manipulation functionality 202 may incorporate the program generation system 102 as one of its components, or vice versa. Likewise, FIG. 2 shows the program execution module 116 as a component within the data manipulation functionality 202. In another case, the data manipulation functionality 202 and the program execution module 116 may represent two distinct modules.

The data manipulation functionality 202 may invoke the program generation system in different modes. In one mode, the user may expressly invoke the functionality of the program generation system 102, e.g., by activating a command button, menu item, etc. within a user interface presentation provided by the data manipulation functionality 202. The user may then expressly identify a set of input-output examples for use in generating the program 114.

In another mode, the data manipulation functionality 202 can include detection functionality which detects that the user is repetitively performing the same type of transformation on a collection of input items to provide corresponding output items. The data manipulation functionality 202 can then automatically invoke the program generation system 102 based on the input-output examples that the user has already supplied.

These usage modes are representative rather than exhaustive. The data manipulation functionality 202 may interact with the program generation system 102 in yet other modes of operation.

The user may directly or indirectly invoke the program generation system 102 to accomplish different data manipulation objectives. In a first scenario, the user can invoke the program generation system 102 when there is some environment-specific desire to convert information expressed in a first format into information expressed in a second format. For example, in one case, the user may receive information from another person (or persons) in a first format. The user may wish to transform this information into a second format that is more acceptable to the user, based on any environment-specific consideration(s). In another case, the user herself may have created the information in the first format. The user may now wish to transform the information into the second format. In another case, the user may receive information from a source application, data store, or the like, expressed in the first format. The user may wish to convert this information into a second format that is more suitable for a target application, data store, or the like. For example, the user may wish to convert information from a format used by a document editing application to a format used by spreadsheet application, or vice versa. In another case, the user wish to convert information expressed in a markup language format (e.g., XML, HTML, etc.) to a non-markup language format, and so on. These examples are presented by way of illustration, not limitation.

In a second scenario, the user may directly or indirectly invoke the program generation system 102 for the primary purpose of extracting one or more data items from input items, obtained from any source. In this scenario, the second format represents a subset of information expressed in the first format.

In a third scenario, the user may directly or indirectly invoke the program generation system 102 based on a combination of reasons associated with the first scenario and the second scenario. For example, in addition to extracting information from the input items, the user may wish to perform any type of transformation on the extracted information. The user may also add information to the output items which has no counterpart in the input items.

The above-described data manipulation scenarios are representative rather than exhaustive. The user may invoke the program generation system 102 to accomplish yet other data manipulation objectives.

In terms of physical implementation, the various modules and systems shown in FIG. 2 can be implemented by one or more computing devices. These computing devices can be located at a single location or can be distributed over plural locations. For example, local data manipulation functionality 202 can interact with a local program generation system 102 to perform the functions summarized above. In another case, local data manipulation functionality 202 can interact with a remote network-implemented program generation system 102 to implement the functions described herein. Further, the various modules and systems shown in FIG. 2 can be administered by a single entity or plural entities.

Any type(s) of computing device(s) can be used to implement the functions described in FIG. 2, such as those referred to in the Exemplary Operating Environment section of this description.

The program generation system 102 and the data manipulation functionality 202 can also interact with one or more data stores 206. For example, the data stores 206 can store input-output examples and the like.

With the above introduction, the explanation now advances to the illustrative composition of the program generation system 102. The program generation system 102 includes (or can be conceptualized to include) a collection of modules. This section provides an overview of these modules. Later respective sections provide additional details regarding each of these modules. By way of overview, the program generation system 102 can convert the input-output examples into the program 114 in a three-part process: a parsing module 208 performs the first part; a transformation module 210 performs the second part; and a formatting module 212 performs the third part.

More specifically, the parsing module 208 identifies respective parts of the input items. The parsing module 208 can also identify respective parts of the output items. The transformation module 210 determines whether each of the output parts identified by the parsing module 208 can be computed using one or more converter modules. The transformation module performs this task by searching within a data store 220. The data store 220 provides a collection of candidate conversion modules. In general, each candidate conversion module transforms input information into output information based on at least one predetermined rule. The formatting module 212 provides formatting instructions which transform selected output parts into a form specified by the original output items. For example, the formatting module 212 can arrange the output parts in an order that matches a format specified by the output items. Further, the formatting module 212 can print constant information to match invariant information presented in the output items.

The program generation system 102 can output the generated program 114 which reflects the processing performed by the parsing module 208, the transformation module 210, and the formatting module 212. The generated program 114 can be used to transform new input items into new output items based on logic embodied in the collection of input-output examples. In one case, the program generation system 102 expresses the generated program 114 as a collection of program modules to be invoked in a particular order. One or more program modules may represent instantiations of converter modules identified by the transformation module 210. One or more other program modules may operate by extracting content in a new input item and printing that extracted content in a corresponding new output item. One or more other program modules may carry out formatting operations identified by the formatting module 212 that affect the appearance (but not necessarily the content) of the output parts, and so on.

Figure 3:
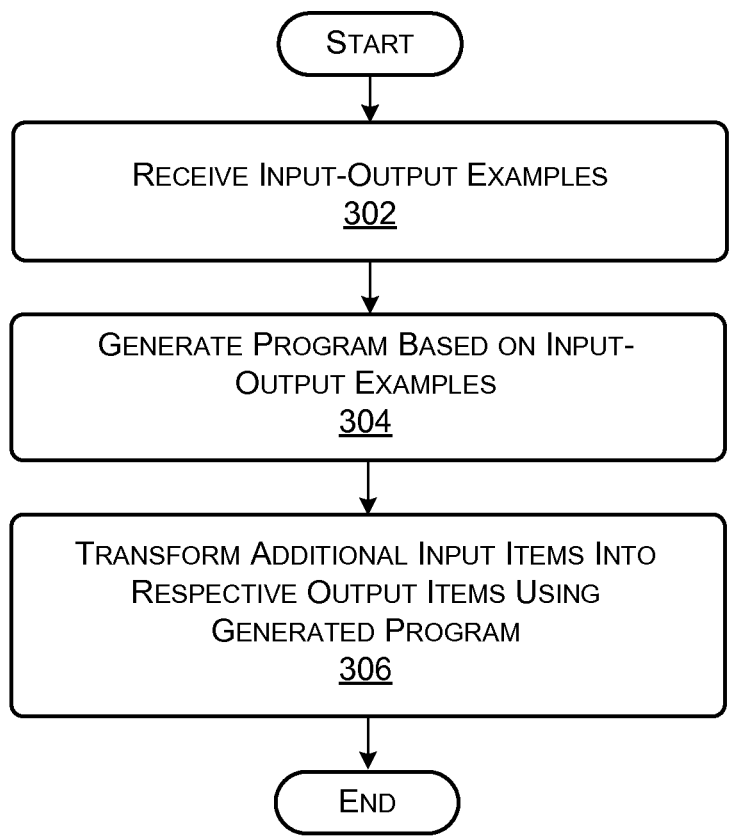
FIG. 3 is a flowchart that shows an overview of one manner of operation of the program generation system of FIG. 2.

FIG. 3 shows a procedure 300 which presents a high-level description of the operation of the data manipulation system 200 of FIG. 1. In block 302, the data manipulation system 200 receives a set of input-output examples. Each input-output example includes a data item (including one or more input string items) and an output item. In block 304, the data manipulation system 200 creates the program 114 based on the input-output examples. In block 304, the data manipulation system 200 uses the program 114 to transform additional new input items (which have not yet been transformed) into new output items.

Figure 4:
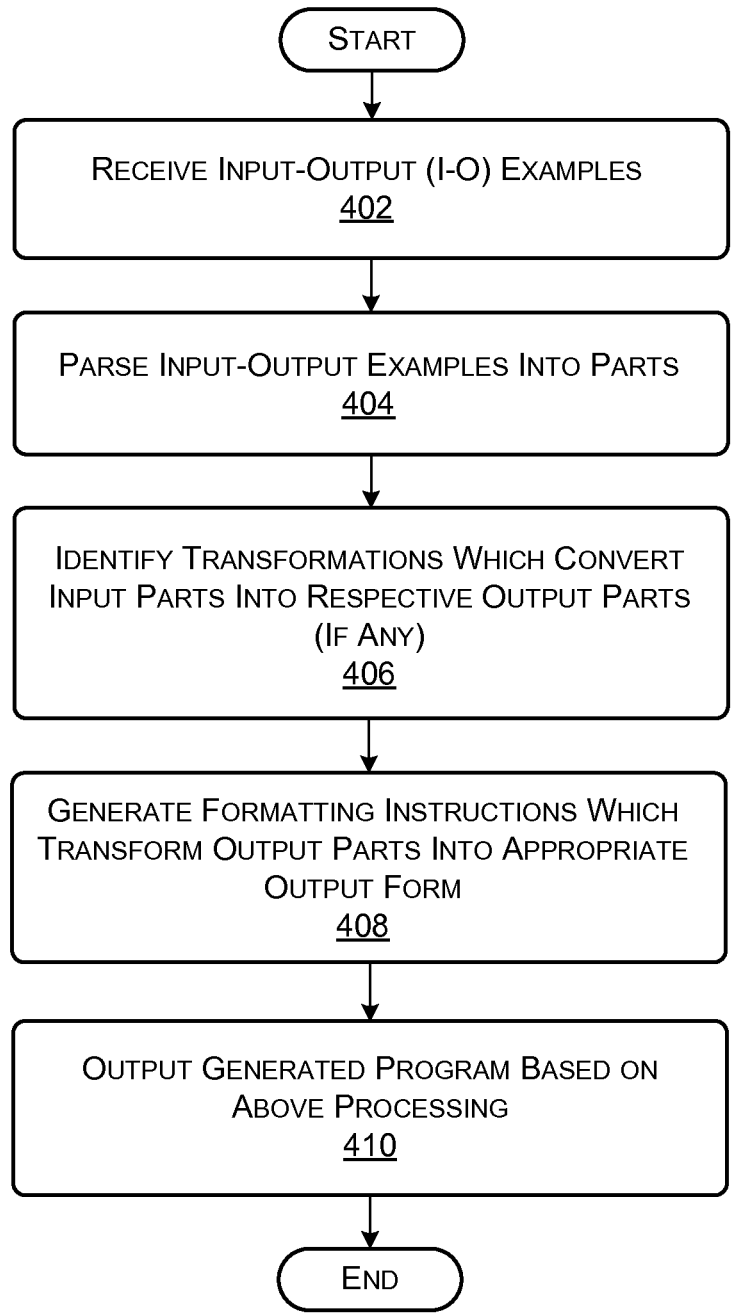
FIG. 4 is a flowchart that shows how the program generation system (of FIG. 2) can generate a program using a three-part operation.

FIG. 4 shows a procedure 400 which presents a more detailed description of the manner in which the program generation system 102 produces the generated program 114. In block 402, the program generation system 102 receives a set of input-output examples. In block 404, the program generation system 102 parses each input item into component input parts, and parses each output item into component output parts. In block 406, the program generation system 102 identifies transformations (if any) which can convert input parts into respective output parts. These transformations are performed by respective converter modules selected from a collection of candidate converter modules. In block 408, the program generation system 102 generates formatting instructions which transform selected output parts into an appropriate form specified by the output items. In block 410, the program generation system 102 outputs the generated program 114 on the basis of the analysis performed by blocks 404-408.

2.0 Semantic Entity Manipulation

The semantic entity manipulation technique embodiments described herein generally modify the ways in which the aforementioned parsing, transformation and formatting modules operate, as well as the ways in which the program generation system produces a generated program. More particularly, the semantic entity manipulation technique embodiments described herein introduce a probabilistic approach to parsing, transformation, formatting and program generation.

In general, a modular framework of semantic entities is introduced that extends the notion of classes to make its functionalities easily accessible to end-users using string interfaces and which allows designers to readily define new entities and operations on these entities. In addition, the design of a probabilistic programming scheme is introduced for facilitating the manipulation of strings representing the aforementioned semantic entities. Programs in this scheme consist of a weighted set of parse-compute-print expressions. Ways of using the probabilistic programming scheme are also presented that are consistent with the user provided set of input-output examples.

In general, a semantic entity is like a wrapper around a library class (with side-effect-free methods) to make its functionality easily accessible to end-users using string interfaces. It facilitates conversion from unstructured and possibly noisy strings to a canonical representation of the underlying class, as well as employing pretty printers for converting from canonical representation of the underlying class into strings.

Providing string based input and output interfaces has the benefit of allowing easy access to class functionalities for end-users, including functionalities or dictionaries that are available online. However, it is noted that end-user provided input and output examples can exhibit potential ambiguity (i.e., multiple interpretations), noise (i.e., data errors), and missing information (such as implicit defaults). To address this circumstance, a generic probabilistic parser framework is employed that requires the entity designer to specify hard and soft constraints for possible field values and a similarity measure between any string and a valid field value.

For manipulating string representations of semantic entities, the aforementioned probabilistic programming scheme is employed whose programs are made up of a weighted set of parse-compute-print expressions, also referred to as pcp expressions. The parse expressions are present at the leaves of pcp expressions and allow for conversion from string representation to some canonical representation (i.e., some normalized intermediate representation). The print expressions are present at the top-level of expressions and allow for conversion from canonical representation to the desired string representation. The semantic interpretation of each pcp expression on an input string returns a weighted set of output strings since the input string can have multiple parses even under a given parse expression. Having a (weighted) set of such pcp expressions serves two purposes. First, it allows the encoding of conditional control flow. In addition, it allows for the representation of a probability distribution over pcp expressions since these expressions are learned from imperfect information. Each program also consists of a weighted set of parse descriptors. This set captures the statistical parsing knowledge that can be built up from a corpus of examples. This set is used to further refine likely parses of a given string before executing it through a pcp expression.

The semantic entity manipulation technique embodiments described herein also enable end-users to compute using data available over the web. This is significant since studies show that most users solve most computational problems in their daily lives by using data or services available over the web. The semantic entity manipulation technique embodiments described herein offer multiple ways to enable seamless access to data and services available on the web. For example, in one implementation, no assumptions are made about the interface to computational modules, and for all practical matters, these computational modules can be API calls over the internet, such as to compute conversion rate between two currency on a given date, or to compute driving distance between two addresses. Further, in one implementation, the set of valid values for an entity or a given field of an entity can be constrained to belong to collections available over the web by some data service provider. This is useful when such collections are huge and cannot be stored locally, or which are continually updated over time.

The foregoing features of the semantic entity manipulation technique embodiments will now be described in more detail in the sections to follow.

2.1 Semantic Entities

A semantic entity (or, simply, entity) E is a wrapper around a library class to make its functionality easily accessible to end-users using string interfaces. In one implementation, an entity is associated with an underlying class, a collection of fields, constraints, and ToCanonical and FromCanonical methods. These semantic entities can be obtained from a database of such entities. In addition, a developer can generate new entities, and provide them directly or store them in a semantic entity database.

The underlying semantic entity class has an unexposed canonical interface along with a set of side-effect-free methods. Semantic entity fields have (typed) representations, where each type can be another entity or a base-type. It is noted that the term "field" as used in this description can also refer to some representation of the actual field. Semantic entity constraints include both hard and soft constraints. Soft constraints are a set of weighted constraints specifying valid field assignments and likely ordering between the fields or delimiters. A hard constraint is defined to be a soft constraint with a weight equal to 1. Any set of constraints that can be implemented as a Boolean check over an entity instance (consisting of assignment to some subset of the fields) and a parse format descriptor (sequence of field names and delimiters) can also be included. In one implementation, the constraints are expressed using the following predicates:

1) InSet(f, S): the field f takes values from a finite set S. Range(f, i, j) is a special case of InSet(f, S) where S={i, ..., j}.
2) FieldOrder(f, f'): field f' follows f in the entity parse format descriptor.
3) DelAfter(f, d): field f is followed by the delimiter d.
4) DelBefore(f, d): delimiter d occurs before field f.

For example, assume a semantic entity of a class named "DateTime" has the following set of fields: "Month"; "Day"; "Year"; "Hours"; "Minutes"; "Seconds"; and "AM-PM", and that the "Month" field has the following representations with corresponding hard constraints:

1) $Month_{Num}$: The representation takes integral month values from the set $\{1, 2, \ldots, 12\}$, i.e., Range($Month_{Num}$, 1, 12); and
2) $Month_{Words}$: The representation takes string month values from the set {January, February, ..., December}, i.e., InSet($Month_{Words}$, {January, ..., December}).

Also assume "DateTime" is associated with the following soft constraints. Namely, that the "Hours" field is more likely to be followed by a "Minutes" field, i.e., (FieldOrder(Hours, Minutes)). In addition, the "AM-PM" field is more likely to be preceded by the "Seconds", "Minutes" or "Hours" field, i.e., FieldOrder(Seconds, AM-PM), FieldOrder(Minutes, AM-PM), and FieldOrder(Hours, AM-PM).

Some other examples of soft constraints include using online dictionaries for matching first names, last names of the Name entity, and addresses for Address entity.

The aforementioned ToCanonical and FromCanonical methods are used to respectively convert an entity instance to and from a canonical representation thereof. More particularly, the method ToCanonical: $e \rightarrow e_C$ is used to convert an entity instance to the canonical representation of the entity.

The method FromCanonical: $e_C \times F \rightarrow e$ performs the inverse operation of converting an entity instance in canonical representation form to a given set of fields F.

For example, assume the semantic entity of a class named "Length" has the following set of fields: "kms"; "m"; "cm"; "mm"; "ft"; "inches"; and so on. Also assume the "cm" field represents the canonical representation of the entity. The ToCanonical method for "Length" adds up the all the field values after appropriately normalizing them with the conversion factor to "cm". The FromCanonical method takes a canonical length unit instance $e_C$ and a set of fields $(f_1, \ldots, f_n)$, and splits the entity value $e_C$ amongst the fields such that the value is wrapped to the next higher field. If no higher field is available to wrap, the highest field stores the extra amount. For instance, suppose a school teacher wanted to register the heights of students in the class in the format ft-inches, but the height data obtained from the students was very irregular—namely in a variety of measuring systems (e.g., m, cm, in, m-cm, and so on). The methods ToCanonical and FromCanonical can convert the irregular input to a consistent format, such as ft-inches or any other desired. This is done by first converting data to the canonical form and then to the desired format.

In one implementation where an entity field is represented by a base type, rather than an entity type, the base-type is associated with a set of pretty printers pp that take as input a string and produce another string. Examples of such base types are integers, strings, doubles. In one implementation, the following pretty printer schemes are employed to facilitate rich formatting of the base-types (which in turn enables rich formatting of entities whose fields have such base-types):

1) Identity: The Identity printer prints the string as it is;
2) UpperCase: The UpperCase printer prints the string in the upper case format;
3) LowerCase: The LowerCase printer prints the string in the lower case format;
4) ProperCase: The ProperCase printer prints the string in the proper case format;
5) Prefix(k): The Prefix(k) printer prints the prefix of length k of the string;
6) IntOrd: The IntOrd printer prints the integer represented by the string in its ordinal form, e.g. 1 to $1^{st}$;
7) IntegerPrecision(d): The IntegerPrecision(d) printer prints an integer in its d digit representation format;
8) DoublePrecision(d): The DoublePrecision(d) printer prints a floating point number with exactly d decimal digits precision;
9) DoubleAtMost(d): The DoubleAtMost(d) printer prints a floating point number with at most d decimal digits precision; and
10) DoubleAtLeast(d): The DoubleAtLeast(d) printer prints a floating point number with at least d decimal digits precision.

The pretty printers in the parse format descriptor take values from one of these printers. The parse format descriptor needs to learn an additional argument parameter for the Prefix (k), IntegerPrecision(d) and DoublePrecision(d) pretty printers. The developer can provide a set of such argument values which would be useful for a given entity. For example, for the "Month" field in "DateTime", generally prefixes of size k=3 are likely to be useful.

2.2 Probabilistic Programming Scheme

As stated previously, in one implementation a probabilistic programming scheme is employed to facilitate the manipulation of strings representing the aforementioned semantic entities. This programming scheme will now be described. The language of this scheme will then be employed in the description of the parsing, manipulation and printing of semantic entities.

In general, a program generated using the probabilistic programming scheme is made up of a weighted set of parse-compute-print (pcp) expressions. A unique feature of this scheme is that a weighted set of outputs is produced by the generated program, instead of a single output, on a given input.

2.2.1 Syntax

In one implementation, the probabilistic programming scheme employs the following syntax:

1) Program P: ={PD, PCP}, where PD={$(p_1, w_1), \ldots, (p_k, w_k)$}, and PCP={$(O_1, w_1), \ldots, (O_n, w_n)$};
2) Parse descriptor p: =[$fd_1, \ldots, fd_m$];
3) Field-delimiter pair fd: =($f_{ij}$, constStr);
4) pcp expr O: =printEntity$_E$(C, q);
5) Compute expr C: =parseEntity$_E$ ($s_i$, p)|T ($C_1, \ldots, C_n$); and
6) Print Format q:=Format (($fd_1, pp_1), \ldots, (fd_n, pp_n)$).

A program P in this language is defined to be a set PD of weighted parse descriptors and a set PCP of parse-compute-print expressions. The symbol w denotes these weights.

A parse (format) descriptor p (for an entity E) is a sequence of pairs fd, where each pair consists of some field (along with its representation identifier) of E and a delimiter. For notational convenience, the representation of a parse descriptor is often flattened out as a string by simply concatenating all elements in the sequence and inside the pair (e.g., [($f_1$; $str_1$), ($f_2$; $str_2$), ($f_3$; $str_3$)] is represented as $f_1$ $str_1$ $f_2$ $str_2$ $f_3$ $str_3$).

A parse-compute-print expression O, also referred to as a pcp expression, is of the form printEntity$_E$ (C, q), where C is some compute expression and q is a print format descriptor for entity E. A compute expression C has a recursive syntax. It is either a parseEntity$_E$ ($s_i$, p) expression that takes as input a string $s_i$ and a parse format descriptor p for entity E (base case), or is a transformation expression T whose arguments are again compute expressions (recursive case).

A print (format) descriptor q is like a parse descriptor except that each field is associated with a pretty printer. The pretty printer for a field whose type is an entity is itself a print format descriptor, while the pretty printer for a field whose type is a base-type is one of its associated pretty printers (as described in Section 2.1).

For example, consider a spreadsheet with two input columns. The first column consists of dates and the second column consists of an integer representing a number of business days. The end-user wants to add the number of business days from the second column to the date in the first column and format the resulting date in a certain way in a third column. For instance, if a spreadsheet row contains the string "24/09/1986" in the first column and string "3" in the second column, and the user desires the string "Monday, 29 Sep. 1986" to be displayed in the third column, one of the pcp expression O in the program to perform the required manipulation could be represented as:

O=printEntity$_{DateTime}$(addBusinessDays($C_1$, $C_2$), $q_3$), where
C1≡parseEntity$_{DateTime}$($s_1$, $p_1$)
C2≡parseEntity$_{Duration}$($s_2$, $p_2$)
$p_1$≡Day$_1$/Month$_2$/Year$_1$
$p_2$≡Days$_1$
$q_3$≡Format((DayOfWeek$_1$, ","), stringP), (Day$_1$, " "), intSupP), (Month$_2$, " "), stringP), (Year$_1$,$\epsilon$, intP))

where the subscripts on the entity field names denote the corresponding field representation. The strings $s_1$ and $s_2$ denote the strings present in the first and second column respectively. The empty string is represented by $\epsilon$.

2.2.2 Semantics

In one implementation, the probabilistic programming scheme employs the following semantics:

$$[\![\{PD, PCP\}]\!]\sigma = [\![PCP]\!]_{PD}\sigma$$

$$[\![\{(O_1, w_1), \ldots, (O_n, w_n)\}]\!]_{PD}\sigma = \{(o_i, w'_i \times w_j) \mid (o_i, w'_i) \in [\![O_j]\!]_{PD}\sigma\}$$

$$[\![O]\!]_{PD}\sigma = \bigcup_{\pi \in getAllParses(\sigma, PD)} \{[\![O]\!]\pi\}$$

$$getAllParses(\sigma, PD) =$$
$$\{[s_j \mapsto (ToCanonical(e_{ij}), p_{ij}, w_{ij})]_j \mid (e_{ij}, p_{ij}, w_{ij}) \in$$
$$getAllParses(\sigma(s_j), PD)\}$$

$$[\![printEntity_E(C, p)]\!]\pi = \text{let } (e, w) = [\![C]\!]\pi \text{ in}$$
$$\text{let } e' = FromCanonical(e, p) \text{ in}$$
$$(printEntityFD(e', p), w)$$

$$[\![T(C_1, \ldots, C_n)]\!]\pi = \text{let } (e_i, w_i) = [\![C_i]\!]\pi \text{ in}$$
$$\text{let } w = Min(w_1, \ldots, w_n) \text{ in}$$
$$(T(e_1, \ldots, e_n), w)$$

$$[\![parseEntity_E(s_i, p)]\!]\pi = \text{let } (e, p', w) = \pi(s_i) \text{ in}$$
$$\text{let } w' = MatchParse(p', p) \text{ in } (e, w \times w')$$

The semantics for evaluating a program P in an input state $\sigma$ (which assigns values to string variables $s_i$) is to evaluate the set PCP of pcp expressions in the input state $\sigma$. The semantics for evaluating PCP=$\{(O_1, w_1), \ldots, (O_n, w_n)\}$ in input state $\sigma$ is to first evaluate each pcp expression $O_j$ in state $\sigma$ to obtain a set of weighted output strings $(o_i, w'_i)$, and then take the union of all such sets after normalizing weights $w'_i$ by multiplying them by $w_j$.

Evaluating a pcp expression $O_j$ in input state $\sigma$ first involves computing a set of weighted parsed states it from 6 using the function getAllParses. This is where the set of weighted parse descriptors PD that is part of the program P is used. The getAllParses function for parsing a string will be described in Section 2.3. Unlike a state $\sigma$ that assigns string values to variables, a weighted parse state $\pi$ assigns a tuple (e, p, w) comprising of (a canonical representation of) an entity instance e, a parse descriptor p and a weight w to each variable s. The pcp expression $O_j$ is then evaluated in each weighted parsed state $\pi$ to obtain a weighted string as an output. The result of evaluation of $O_j$ in input state $\sigma$ then is the collection of all such weighted strings. Note that this is how a probabilistic interpretation is assigned to execution of a pcp expression on input strings with possible ambiguous parses.

Evaluating a pcp expression $O_j$=printEntity$_E$(C, q) in a weighted parse state $\pi$ involves evaluating the computation expression C in $\pi$, which yields a weighted entity instance (e, w). The entity instance e thus obtained is converted from its canonical representation to a representation e' in accordance with the print format descriptor q. The entity instance e' is further converted to a string representation in accordance with the print format descriptor q.

Evaluating the recursive case of the computation expr $T(C_1, \ldots, C_n)$ involves recursively evaluating its arguments. The canonical entity instance is generated by invoking the transformation T on the canonical entity instances corresponding to the results of evaluating the arguments. The corresponding weight is computed to be the minimum of the weights associated with the evaluation results of each of the arguments. This represents the fact that a high confidence is associated with the results of a computation if and only if each of the inputs required for the computation had a high confidence.

Evaluating the base case of the computation expr parseEntity$_E$ ($s_i$, p) in the weighted parse state $\pi$ involves computing the closeness measure w' between the format descriptors p' and p, where p' is the parse descriptor in the tuple $\pi(s_i)$. The weight w' is then used to adjust the weight w of the entity instance e corresponding to string $s_i$ in the state $\pi$. This weight normalization helps in providing a higher weight to the result of the top-level pcp expression if and only if the string $s_i$ entails a valid parse descriptor that is similar to p.

It is noted that given P=$\{PD, \{(O_1, w_1), \ldots, (O_n, w_n)\}\}$. Let $\sigma$ be an input program state. Corresponding to every (weighted) parse $\pi_i$ of the (tuple of variables in) state $\sigma$ and every pcp expression $(O_j, w_j)$, a weighted output string pair $(o_{ij}, w'_{ij}) \in [\![P]\!]\sigma$ is generated. The value of $w'_{ij}$ is relatively high if and only if the following quantities are high—the weights corresponding to parses of strings (used in $O_j$) in the state $\pi$, the similarity measure between those parses and the corresponding parse descriptors that occur at the leaves of the pcp expression $O_j$, and $w_j$.

The next three sections emphasize the three key functional aspects of the foregoing probabilistic programming scheme, namely parsing of strings into entities, computing over entities, and printing entities into string representations.

2.3 Illustrative Parsing Module

This section describes one implementation of the aforementioned parsing module which provides the rich probabilistic support that the foregoing probabilistic programming scheme offers to parse strings into a set of weighted parses—including ambiguous strings (strings with multiple parses) and noisy strings (strings with no valid parse). Parsing is performed during the learning phase to parse both the input and output strings in an example, so as to learn a potential set of compute expressions. Parsing is also performed during run-time on inputs for program execution.

2.3.1 Field Matches

The parsing begins with identifying field matches. These will be used to construct parse graphs as will be described shortly. Given a string s and an entity e, field matches are defined as longest sub-strings in s that match a field of e. The set of all field matches $M_f(s)$ of field f in string s is defined to be:

$M_f(s)=\{(i,j) \mid s[i..j]$ is a longest substring of s that matches field f$\}$.

2.3.2 Parse Graphs

A parse graph G is used to represent all parses for a given string s as an instance of entity e. Given the string s and an entity e, a parse graph can be constructed as follows.

In one implementation, the parse graph G=(V, E) is constructed from the set of field matches $M_f(s)$ in the following manner. There exists a node $n_i \in V(G)$ corresponding to each index i in the string s (0<i<Len(s)). This results in |V|=Len(s) number of nodes in the graph. The set of edges in the graph are partitioned into two kinds, namely field edges $E_f(G)$ and delimiter edges $E_d(G)$, such that $E(G)=E_f(G) \cup E_d(G)$.

A directed edge (u, v, l)$\in$E(G) corresponds to an edge between node u to node v labeled with the label l. There exists a field edge $(n_i, n_j, f) \in E_f(G)$ if $(i,j) \in M_f(s)$. There also exists a delimiter edge $(n_i, n_j, d) \in E_d(G)$ if $(j \geq i)$. It is noted that a given substring can be matched with multiple fields and hence there can be multiplefie$_f$d edges b$_e$tween two given no$_d$es. Also delimiter edges induce self-loops $_c$orr$_e$sponding to a delimiter value $\epsilon$.

A parse P is defined as a directed path from node $n_1$ to $n_{Len(s)}$ in G such that the edges on the path alternate between the field edges $E_f(G)$ and the delimiter edges $E_d(G)$. Formally, parse P is defined as a directed path $(e_1, e_2, \ldots, e_k)$ if:

1) $e_1.u=n_1$ where the start node of path $e_1.u$ is the beginning of the string;
2) $e_k.v=n_{Len(s)}$ where the end node of path $e_k.v$ is the end of the string;
3) $e_i \epsilon E_f(G)$ if and only if $e_{i-1} \epsilon E_d(G)$, $\forall_i > 0$ where if $e_i$ is a field edge, then the previous edge on the path $e_{i-1}$ is a delimiter edge; and
4) $e_i \epsilon E_d(G)$ if and only if $e_{i-1} \epsilon E_f(G)$, $\forall_i > 0$ where if $e_i$ is a delimiter edge, then the previous edge on the path $e_{i-1}$ is a field edge.

The set of parses SP contains all such parses P. The function getParseGraph takes as argument a string s and an entity e, and returns the corresponding parse graph G.

2.3.3 Matching Parses

The function MatchParse takes two parse descriptors $p_1$ and $p_2$ as arguments (where one of the parse descriptors is from the library of parse descriptors and the other is associated with a semantic entity associated with an input or output item), and computes a weight w representing the similarity of the two format descriptors. A perfect match of fields and delimiters is given the highest weight. In one implementation, if the two format descriptors do not match perfectly, the hamming distance between the field and delimiter matches between the two format descriptors is computed. The weight representing the closeness measure is computed inversely proportional to the hamming distance.

2.3.4 GetAllParse Method

The function getAllParses takes a string s and a set PD of parse descriptors as arguments and returns a weighted set of entity instances and the corresponding parse descriptors representing different parses of string S. The function first constructs the parse graph G from s and e using the getParseGraph function. Each parse path p in the program is assigned a weight w proportional to the fraction of the soft constraints satisfied by it and the similarity to the parse descriptors in PD. The function then returns the set of weighted entity and parse descriptor tuples (e, p, w).

2.4 Illustrative Transformation Module

Figure 5:
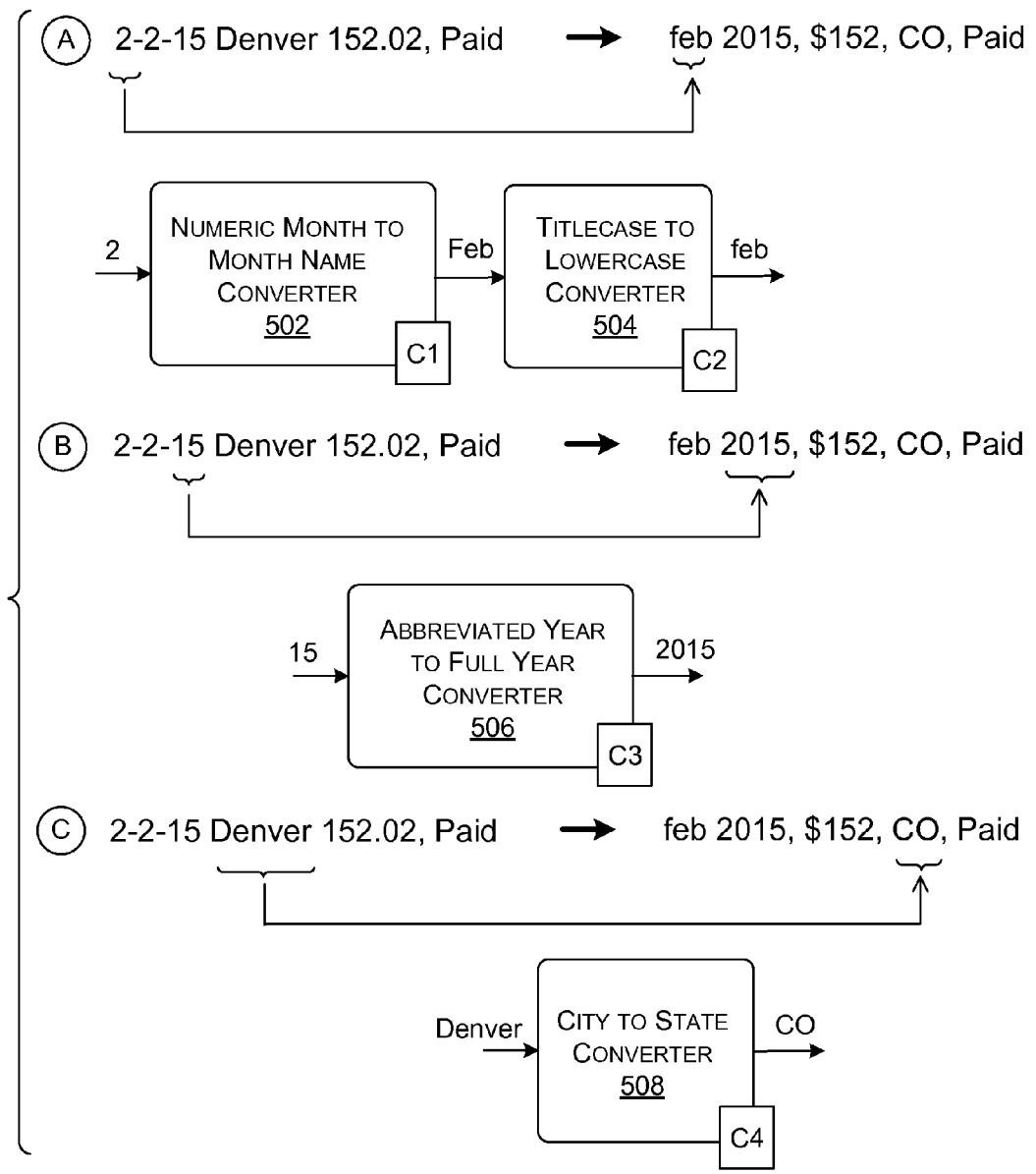
FIGS. 5 and 6 together show an example which illustrates one manner of operation of a transformation module that is used in the program generation system of FIG. 2.
Figure 6:
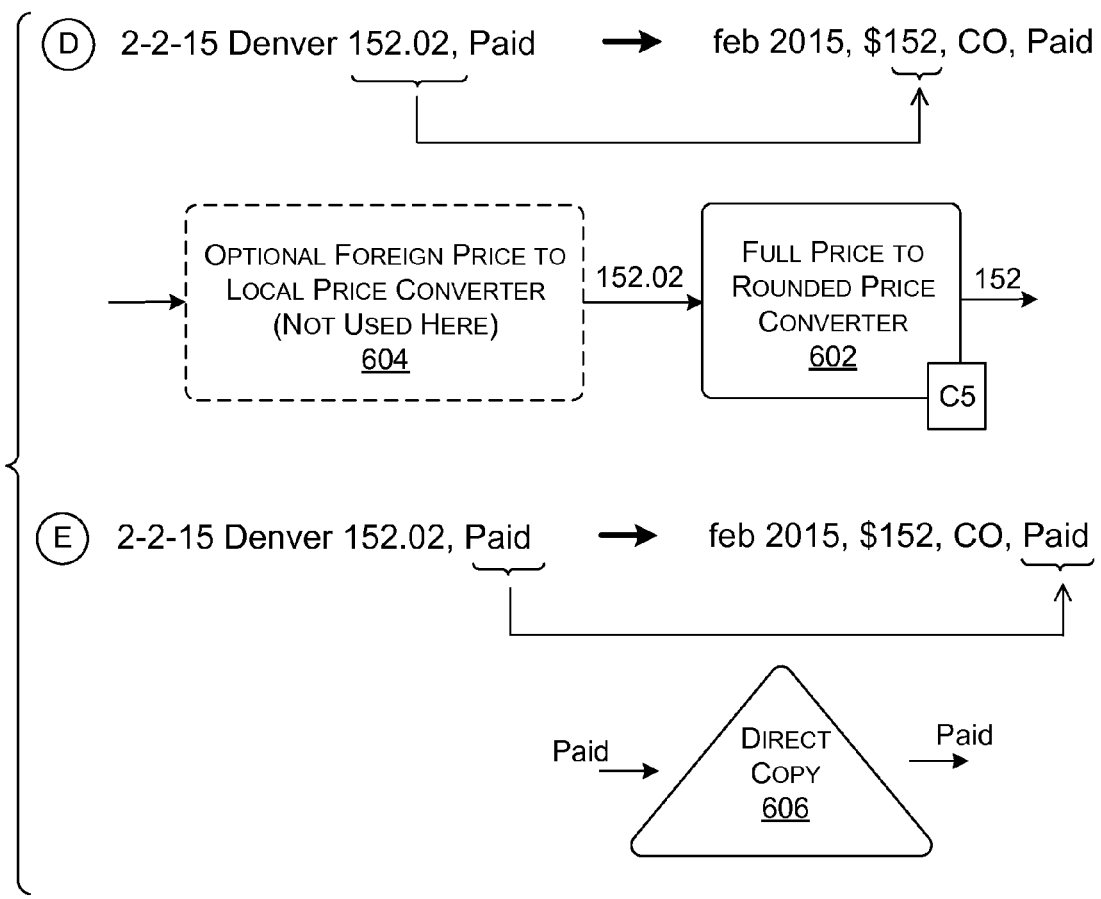

This section describes one implementation of the transformation module 210 of FIG. 2. As mentioned previously, the transformation module 210 identifies one or more converter modules that can be used to transform input parts into corresponding output parts. As described in the previously-identified parent patent application, and referring to FIGS. 5 and 6, it will be shown how different output parts correspond to different respective input parts. For each such case, the transformation module 210 investigates the collection of candidate converter modules (in data store 220) to determine whether there is one or more converter modules that can perform the transformation of the identified input part to the corresponding output part. In one case, the transformation module 210 identifies a single converter module that can perform the desired conversion. In other cases, the transformation module 210 identifies two or more converter modules that perform the desired conversion when applied in a specified sequence. In yet other cases, the transformation module 210 may not be able to find any converter module which performs the desired conversion.

Starting with the scenario labeled "A" the transformation module 210 identifies two converter modules (502, 504) that can generate "feb" in the output item based on the numeric month "2" in the input item. Namely, the converter module 502 receives a numeric month as an input and generates a three-letter month label (e.g., Feb) as an output. The converter module 504 receives a titlecase sentence as an input and generates a lowercase sentence as an output.

In scenario B, the transformation module 210 identifies a single converter module 506 that can generate "2015" in the output item based on the number "15" in the input item. Namely, converter module 506 receives a two-digit year number as an input and generates a four-digit year number as an output.

In scenario C, the transformation module 210 identifies a single converter module 508 that can generate "CO" in the output item based on "Denver" in the input item. Namely, the converter module 508 receives a city name as an input and generates a corresponding state name as an output, where the state name corresponds to the state in which the city is located. The converter module 508 can use a predetermined lookup table to perform this type of conversion.

In scenario D, the transformation module 210 identifies a single converter module 602 for generating the number "152" in the output item based on the number "152.02" in the input item. Namely, the converter module 902 receives a floating point dollar amount as an input and generates a rounded-off dollar amount as an output. Although not used in this example, in other scenarios, the transformation module 210 can rely on a converter module 604 to convert monetary information from one currency basis to another, e.g., from British pounds to U.S. dollars, etc.

In scenario E, the transformation module 210 determines, based on the parsing information provided by the parsing module 208, that the word "Paid" in the output item exactly matches the same word in the input item. In this case, the transformation module 210 can forego an attempt to find a converter module to produce the output part "Paid." Instead, the program generation system 102 will generate a program module 606 which simply extracts the last word in the input item and repeats it as the last word in the output item.

In one implementation, the transformation module 210 successively applies different candidate converter modules to identify converter modules that produce the desired result. After each computation using a particular converter module, the transformation module 210 can determine whether the output information generated by that converter module matches output parts within the output items in a consistent manner. For example, for scenario C, the transformation module 210 can successively feed the collection of city names to different candidate converter modules. The transformation module 210 can conclude that the city-to-state converter module 508 produces strings which consistently match the names of the states identified in the output items. Hence, the transformation module 210 can conclude that the converter module 508 is an appropriate choice to produce the state names in the output items. As stated above, in some cases, a transformation entails the use of two or more converter modules to convert an input part into a corresponding output part. Hence, the transformation module 210 can also methodically investigate different combinations of converter modules.

Figure 7:
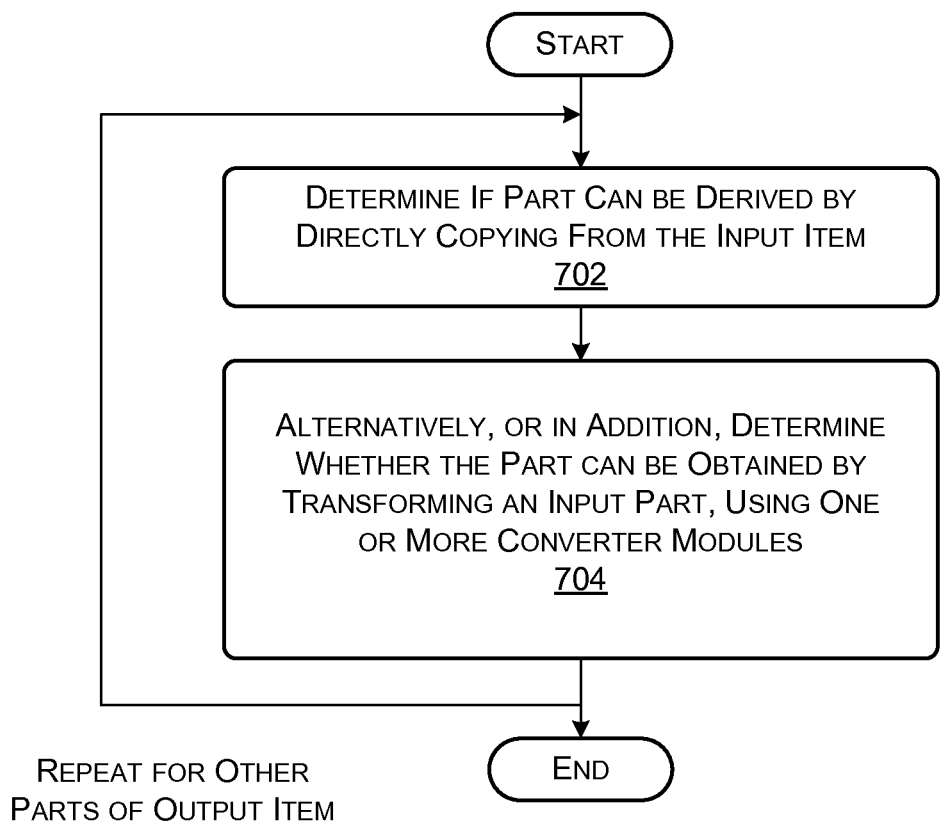
FIG. 7 is a flowchart which complements the example of FIGS. 5 and 6, e.g., by showing an overview of one manner of operation of the transformation module.

FIG. 7 shows a procedure 700 which summarizes the above concepts in flowchart form. In block 702, the transformation module 210 determines whether an output part under consideration can be derived by directly copying a corresponding input part from a corresponding input item. If so, the transformation module 210 can forego the investigation performed in block 704. In block 704, the transformation module 210 can determine whether the output part under consideration can be derived from a corresponding input part using one or more converter modules.

The loop in FIG. 7 indicates that the transformation module 210 can repeat the above analysis until it has identified a complete set of converter modules that may be used to generate output parts of the output items. In some cases, the transformation module 210 can conclude that one or more output parts cannot be derived using converter modules. Indeed, in some cases, the transformation module 210 can conclude that no output parts can be derived using converter modules.

In the above examples, it was assumed that all of the input items (associated with the input-output items) adopt a consistent format. In this case, a converter module (or combination of converter modules) is a viable choice if it provides a successful transformation for all instances of the input-output examples. In other implementations, the program generation system 102 can process input items that adopt two or more formats. For example, assume that the input items of FIG. 1 include two ways of describing the invoice information. In this case, the transformation module 210 can identify a first converter module (or combination of converter modules) which works for a first subset of input-output examples and a second converter module (or combination of converter modules) which works for a second subset of input-output examples. The generated program 114 can use conditional cues that appear in the input items to determine whether the first converter module or the second converter module is to be invoked.

In one implementation, the program generation system 102 uses an extensible framework to implement the collection of candidate converter modules. Developers can add new converter modules to the collection providing that these new converter modules conform to the format set forth by the extensible framework (which in the case of the semantic entity manipulation technique embodiments described herein can be the aforementioned probabilistic programming scheme).

In the context of the semantic entity manipulation technique embodiments described herein, the transformation module 210 identifies converter modules that transform the semantic entities associated with the inputs into the corresponding semantic entities associated with the outputs, for the example input-output entries. However, the search for suitable converter modules does not end when one producing the desired results is found. Rather, the successive analysis of the results produced by each converter module associated with the type of semantic entity being considered continues until all such converter modules are considered. When multiple converter modules (or different combinations of multiple converter modules) each produce the desired transformation of a semantic entity, all are considered in producing outputs, as will be described later.

Additionally, in the context of the semantic entity manipulation technique embodiments described herein, the transformation module employs the rich support that the previously-described probabilistic programming scheme offers to designers to implement arbitrary computational modules, without requiring the end-users to worry about discoverability or usage syntax. Recall that a compute expression C is either a parseEntity$_E$(s$_i$, p) expression or is a transformation expression T(C$_1$, . . . , C$_n$). Here, T is any transformation that takes as input a canonical representation of semantic entities and outputs some semantic entity in a canonical representation. The side-effect-free methods associated with underlying classes or data-types that are wrapped up by entities are a good choice of useful transformations.

In the following sections, some useful transformations are described to support a large class of tasks that end-users will desire in practice. As can be appreciated, these examples are presented by way of illustration, not limitation. The collection of converter modules can include yet other types of modules.

2.4.1 Arithmetic Transformations

Performing arithmetic operations on input entities to produce a desired output can be a very useful transformation in a number of contexts. For example, in one implementation, a "DateTime" entity can be constructed that identifies date-time strings in an input and also identifies a duration string. Given this data, a number of arithmetic transformations can be performed to produce a date-time output. For instance, an "addDuration" or "subtractDuration" converter module can be generated to respectively add or subtract the identified duration from an identified date-time to yield another date-time. The "DateTime" entity could also support a "getBusinessDays" converter module that computes the number of business days between two date-time strings, or a "getDuration" converter module that computes the duration between two date-times.

As another example, in one implementation, a "Unit" entity can be constructed that identifies strings in an input that represents length measurements. An "addLength" or "substractLength" converter module can then be employed to respectively add or subtract a pair of identified length measurements to compute an output length measurement.

2.4.2 Round-Off Transformations

Performing round-off computations on input entities to produce a desired output can also be a very useful transformation. For example, input entities representing data ranging from bank balances, stock prices to employee's work hours can be rounded off using a converter module. This rounding could entail rounding-off a currency amount to the upper quarter-dollar, rounding-off a time to the lower half hour slot, rounding-off a number to the nearest integer, and so on. All entities that are associated with a numerical measure and that have a total order defined between their fields can support round-off transformations to a desired precision. Some of the common entities that fall in this category are: date-time, duration, units, numbers, and currencies.

In one implementation, this rounding off transformation is realized as follows. A roundOff(e, z, k, f Mode) transformation to round the value of an entity e (using mode "Mode" which can be lower, upper or nearest) to the multiple of k value for field f with the z entity as a zero reference. This rounding is defined based on following attributes:

1) A numerical measure NM(e) associated with an entity instance e. A base field $f_{base} \in Fields(e)$ is defined for each entity. A conversion factor $c_f \in \mathbb{R}$ is defined for all other fields $f \in Fields(e)$ that converts the field values to the base field values. The numerical measure is then defined as NM(e)=$\Sigma_{f \in Fields(e)}(C_f * v_f)$ where $v_f$ represents the value of field f.
2) A zero element z.
3) a precision factor (PF) defined by PF=$k * c_f$.

A "roundOff" converter module computation such as the one shown in FIG. 8 can be employed to perform the (e, z, k, f Mode) rounding off transformation on an entity instance e. It first computes the numerical value measure NM(e) and the precision factor PF values. Then it computes the quotient q and remainder r values obtained by dividing NM(e)−z by PF. From the quotient and remainder values, the lower bound $L_e$ and upper bound $U_e$ are computed on the entity value which lies on the desired precision boundary. The method getEntity: Integer→e returns the entity corresponding to the numerical measure argument. According to the desired rounding off mode "Mode", appropriate entity e' is returned.

2.4.3 Network Transformations

Network transformations are those entity transformations that are supported by the use of semantic dictionaries or services available over a computer network such as the Internet or a proprietary intranet. The semantic entity manipulation technique embodiments described herein offer end-users a seamless access to such services without the need to learn and write web-scripts. Described below are some exemplary network transformations associated with two exemplary entities (i.e., a currency entity and an address entity).

2.4.3.1 Currency Entity

Figure 9:
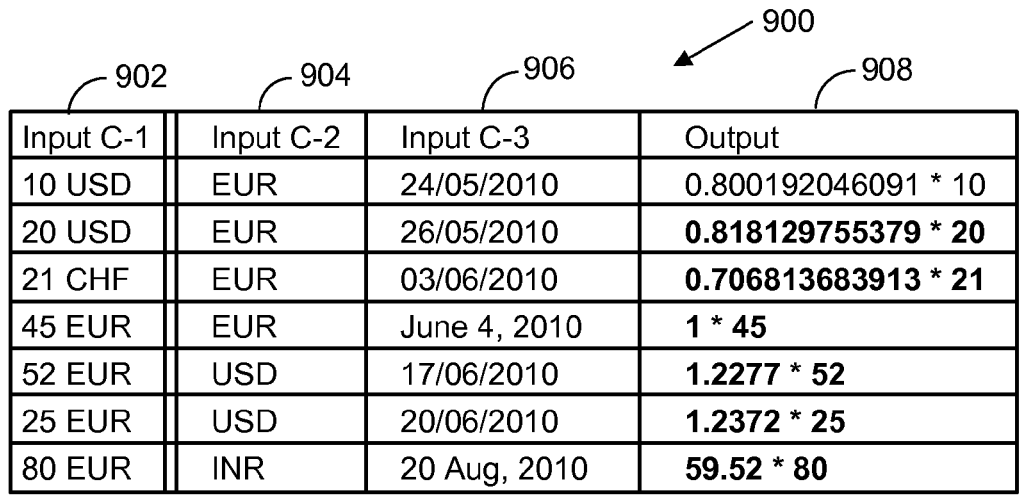
FIG. 9 shows a table of currency data where an end-user wants to translate the currency in column-1 into the currency type shown in column-2 using the currency conversion rate on the date shown in column-3, to obtain the result as shown in the output column. The first row shows an input-output example provided by the end-user.

In one implementation, for a pair of two currencies, and a given date, a converter module can be designed and employed to obtain the currency exchange rate prevalent on the given date. For example, in the table 900 shown in FIG. 9, an end-user wants to translate the currency in column-1 902 into the currency type shown in column-2 904 using the currency conversion rate on the date shown in column-3 906, to obtain the result as shown in the output column 908. For this purpose, the end-user manually employs a currency conversion widget that takes in a source currency type, destination currency type and the date of transaction to give back the currency conversion rate. In particular, the end-user feeds the strings "USD", "EUR", and "24/05/2010" into the currency conversion widget and gets back, for example, the result "0.800192046091". The end-user uses this result to populate the entry in the output column for the first row. One implementation of the semantic entity manipulation technique embodiments described herein then automatically populates the remaining cells in the output column with the values shown in bold using a currency converter module.

2.4.3.2 Address Entity

Some exemplary address entity-related transformations include the following. For an address object, obtaining its current local time, weather, latitude, longitude, and nearest amenity (e.g., airport, bus-stop, coffee shop, etc). For a pair of two address objects, obtaining driving time/distance, driving time in rush-hour traffic, walking time/distance between them. For a pair of two cities (not addresses per se but locations nonetheless) and a given date, obtaining information about direct flights between them and the cheapest cost of such a direct flight. This type of information can be readily obtained via the Internet.

Figure 10:
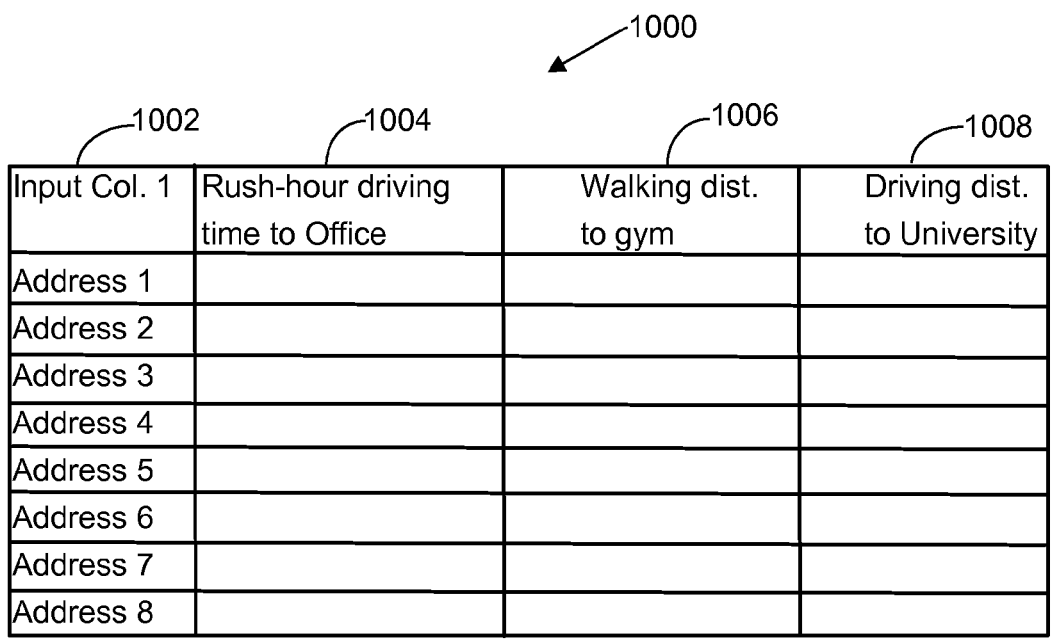
FIG. 10 shows a table of distance data where an end-user wants to make an informed selection from among eight apartments (whose addresses are presented generically in the first column of the table) depending on commuting attributes to some specific locations such as the rush-hour driving time to the user's office, the walking distance to the nearest gym, and the driving distance to the nearest University.

Thus, in one implementation, given an address (or location of some type), a converter module can be designed to obtain the desired computed information as an output. For example, in the table 1000 shown in FIG. 10, an end-user wants to make an informed selection from among eight apartments (whose addresses are present in the first column 1002 in the table 1000) depending on commuting attributes to some specific locations such as the rush-hour driving time to the user's office, the walking distance to the nearest gym, and the driving distance to the nearest University (shown in the respective output column headers 1004, 1006, 1008 of the table 1000). The end user obtains this information for the first row. One implementation of the semantic entity manipulation technique embodiments described herein then automatically populates the remaining cells in the output columns with the desired information (not shown) using the appropriate converter modules.

2.4.3.3 Other Entities

Other interesting instances of transformations involving obtaining information concerning other semantic entities include those that fetch personal data stored by various websites (e.g., financial portfolios, credit-card expenses), or organizational data stored in active directories (e.g., calendar details, management hierarchy).

2.5 Illustrative Formatting Module

This section describes one implementation of the formatting module 212 of FIG. 2. As mentioned previously, the formatting module 212 generates formatting instructions which present the output parts to the end-user in a form specified by the original output items which were part of the examples provided by the user.

The foregoing probabilistic programming scheme offers rich support for printing entities as strings. This is enabled by the top-level construct printEntity$_E$ of a pcp expression that takes as input a print format descriptor $q=\{(f_1, d_1\ pp_1), \ldots, (f_n, d_n, pp_n)\}$, which is a sequence of tuples containing a field representation, delimiter and a pretty printer. The semantics of the printEntity constructor involves using the function printEntityFD to print the corresponding entity instance using q, which prints the entity instance as a sequence of field representation and delimiter strings in accordance with q. The printing of field representation takes place with the corresponding pretty printer associated in the tuple. The printing of base data-type fields are handled by the pretty printer schemes described in Section 2.1. The printing of an entity-type field is done by recursively calling printEntityFD on the entity instance and the print descriptor corresponding to that field.

For example, FIG. 11 shows the formatting strings required in Microsoft Corporation's Excel® Spreadsheet Application or the C# programming language to print a double value in different formats. FIG. 12 shows the format strings for date-time objects in Microsoft Corporation's Excel® Spreadsheet Application or the C# programming language. The print format descriptor expressions q are expressive enough to represent each of these formatting intents. Furthermore, the formatting module can infer each of these formatting intents from input-output examples. Thus, the user need not remember the formatting descriptors.

2.6 Learning Probabilistic Programs

Given input-output examples, a semantic entity manipulation program P can be learned, which when run on the other non-exemplary inputs computes the desired outputs. Without loss of any generality, it is assumed that the input is a tuple of strings, and the output is a single string. The probabilistic program P consists of two components: a set PD of weighted parse descriptors and a set of weighted pcp expressions.

First, it will be described how the set PD of weighted parse descriptors are learned from the given input and output examples. For every string s, in all input and output examples, the set $\{(e_1, p_1, w_1), \ldots, (e_n, p_n, w_n)\}$ of all parses of s is computed using the method getAllParses. Let PD' be the multi-set union of the sets $\{(p_1, w_1), \ldots, (p_n, w_n)\}$ corresponding to each string s. Any two elements $(p_1, w_1)$ and $(p_2, w_2)$ in PD' are iteratively replaced by $(p_1, w_1+w_2)$ if $p_1=p_2$. PD is then defined to be the resultant set PD'.

For example, consider a spreadsheet with dates in three different formats (i.e., US format: Month/Day/Year, European format: Day.Month.Year, and Chinese format: Year-Month-Day), as shown in FIG. 13. It is noted that some of these dates are missing the year, which is supposed to default to the current year. This computation desired by the user is best described as a conditional computation where the year in the output is copied from the input (if it exists), or is defaulted to the current year if the input does not contain a year. This is handled as described previously by representing the semantic entity manipulation program as a (weighted) set of pcp expressions. The probabilistic interpretation of such programs (on an input) gives more weight to those pcp expressions whose corresponding parse expressions match more closely with the input.

The end-user also wants to format the dates in a uniform format as indicated by the first two output examples (shown italicized). The output format has several nuances. For instance, the month strings are printed using a three-letter prefix and in title-case (i.e., the first letter is in uppercase). The day integers are printed with the appropriate suffix of 'st', 'nd', 'rd', or 'th'. It is noted that the semantic entity manipulation technique embodiments described herein support such rich formatting by allowing a developer to associate pretty-printing routines with only base-types such as strings and integers.

The input string data has multiple interpretations and noise. This is handled as described previously by using probabilistic interpretation to generate a weighted set of parses (the higher the weight, the more likely the parse). In particular, for the input Jun. 3, 2008, the parse Month/Day/Year is preferred over Day/Month/Year because the computation yielded to compute the output of Jun. 3, 2008 is the simplest one (namely, the identity map). For the input 2.5.2008, the parse Day.Month.Year is preferred over Month.Day.Year because the parse descriptor Day.Month.Year has a more significant presence in the spreadsheet (in particular, 25.3.2007 has the parse Day.Month.Year). The input '09-February-1 is likely parsed as Year-Month-Day because the string February most closely matches a month name February, and the integer 09 is preceded by the "'" character, which is a likely delimiter occurring before a 2 digit year string.

A semantic entity manipulation program can be learned which will generate the desired output from the first two input-output examples and the remaining non-exemplary inputs shown in FIG. 13. More particularly, the weight of the parse descriptor $p_1$=$Day_1$.$Month_1$.$Year_1$ is 4 times more than the weight of the parse descriptor $p_2$=$Month_1$.$Day_1$.$Year_1$. This is because there are 4 inputs (namely, 2.5.2008, 25.3.2007, 26.3.2007, 27.3.2007) for which $p_1$ is a valid parse descriptor, and only one input (namely, 2.5.2008) for which $p_2$ is a valid parse descriptor. Hence, the input date 2.5.2008 has a higher weight associated with its parse corresponding top $p_1$ than with its parse corresponding to $p_2$. This illustrates that the use of weighted parse descriptors allows the probabilistic parsing to correctly estimate most likely parses for otherwise ambiguous input strings.

Now suppose the spreadsheet had a noisy input 5.16.2010. The weights associated to parse descriptors will still be in favor of $p_1$ by 4 to 2, and hence the highest weighted parse for 2.5.2008 will still be the one corresponding to $p_1$. This illustrates that use of weighted parse descriptors keeps probabilistic parsing robust in presence of noise in the data.

Next, it will be described how the set PCP of weighted pcp expressions is learned. Consider a single row containing one of the input-output examples. For the input string $s_i$ in the $i^{th}$ column of the example row, its set $\tilde{G}_i$ of weighted parse descriptors (e,p,w) is obtained using the getAllParse method. Each parse returns an entity instance e in its canonical form. In a similar way, the set of parse descriptors for the whole row $\vec{G}=\tilde{G}_1 \times \ldots \times \tilde{G}_k$ is computed. The set of parse descriptors $\tilde{G}'$ is then obtained for the output string r. For each input entity instance vector $\vec{e}=(e_1, \ldots, e_k)$ such that $[(e_1, p_1, w_1), \ldots, (e_k, p_k, w_k)] \in \vec{G}$ and each output entity instance e' such that (e', p', w') $\in \tilde{G}'$, a set of weighted computations $\tilde{C}$ that maps $\vec{e}$ to e' is learned. A type-based exhaustive search is performed over the set of available transformations to compute $\tilde{C}$ (with a bound on the number of transformations used in the computation in one implementation). Weight(C) for any computation $C \in \tilde{C}$ is defined to be $\oplus (w_1, \ldots, W_k, w') \times$ simplicity(C), where in one implementation the composition function $\oplus$ is defined to be the min function, and the simplicity measure of C is defined to be the inverse of the size of C. To print the computed entity $e'_j$ in the desired output format, the print parse descriptor $q'_j$ also needs to the learned. The print parse descriptor $q'_j$ is learned from the parse descriptor $p'_j$ comprising of (f, d) pairs by exhaustively searching the pretty printers used for printing the field representations f in $p_j$.

Let PCP' be the multi-set union of the sets {(PrintEntity(C, $q'_j$), weight(C))|$C \in \tilde{C}$}. Any two elements ($O_1$, $w_1$) and ($O_2$, $w_2$) in PCP' are iteratively replaced by ($O_1$, $w_1+w_2$) if $O_1=O_2$. PCP is then defined to be the resultant set PCP'.

For example, assume an end-user wants to format stock prices in column 1 of a spreadsheet with 6 decimal digits to 2 decimal digits. The end-user gave an example row containing "12.124532" as input and "12.12" as the corresponding output. Two of the possible computations that can achieve this transformation are: print at most 2 decimal places, and print exactly 2 decimal places. Then, the end-user gave another example row with "12.1" as input and "12.10" as output. Again two of the possible computations are: print at least 2 decimal places and print exactly 2 decimal places. The learned probabilistic program P will contain a set of weighted pcp expressions that has twice the weight for the pcp expression corresponding to the "exactly 2 decimal places" transformation than the weight of the pcp expressions corresponding to the "at most 2 decimal places" and "at least 2 decimal places" transformations because these latter two only achieve the result in one of the respective examples. Hence, when P is run on a new input, the highest ranked output will correspond to the transformation "exactly 2 decimal places". This example illustrates that the learned semantic entity manipulation program for generating the weighted set of pcp expressions has the desired property of giving more weight to pcp expressions that represents computations that are common across multiple input-output examples.

Consider yet another example. This example shows how a learned semantic entity manipulation program models conditionals, such as the missing year feature described in connection with the spreadsheet of FIG. 13. From the two input-output examples, the following two pcp expressions are learned with higher weights amongst others:

{PrintEntity$_e$($\tilde{C}_1$, $q_1$), $w_1$}, {PrintEntity$_e$ ($\tilde{C}_2$, $q_2$), $w_2$} where $\tilde{C}_1$=(parseEntity$_e$($s_1$, $p_1$)), $p_1$=$Month_1$/$Day_1$/$Year_1$, $q_1$={($Month_2$, " ", string-PrefixP(3)), ($Day_1$, ",", IntOrd), ($Year_1$, $\epsilon$; Identity)}, $\tilde{C}_2$=setYear(parseEntity$_e$ ($s_2$, $p_2$), 2010), $p_2$=$Month_1$/$Day_1$ and $q_2$ is same as $q_1$.

Now given a new input "4.24", its parse descriptor p=$Month_1$.$Day_1$ matches $p_2$ more than $p_1$, and therefore the computation $\tilde{C}_2$ will be performed on the input with much higher weight than the identity computation. Implicitly the learned program is distinguishing the inputs which have no year fields in their parse descriptors.

2.7 Illustrative Semantic Entity Manipulation Process

Figure 14:
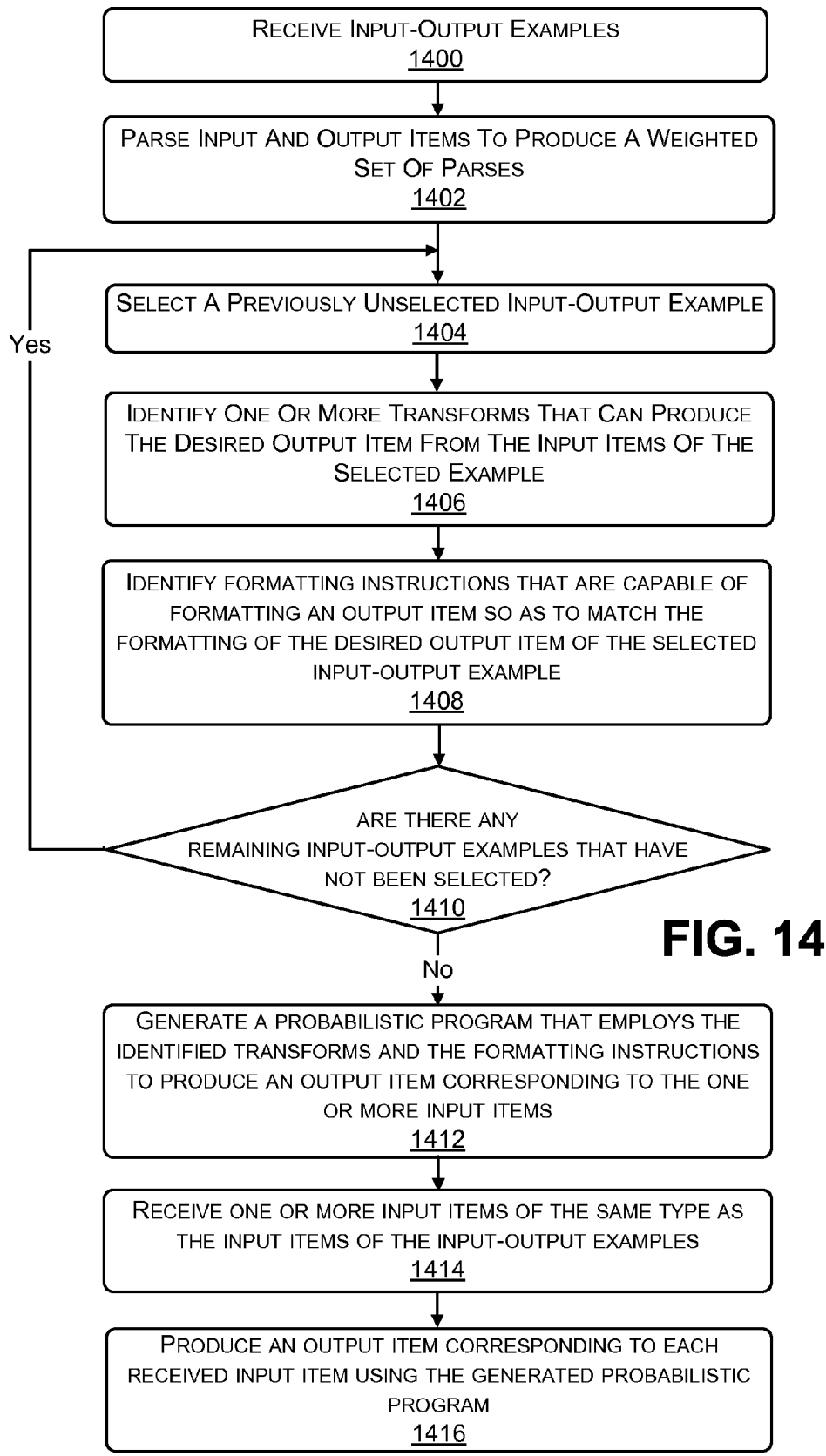
FIG. 14 is a flowchart generally outlining an exemplary process for implementing the semantic entity manipulation technique embodiments described herein.

In view of the foregoing, one exemplary process for implementing the semantic entity manipulation technique embodiments described herein will now be described. Referring to FIG. 14, the exemplary process begins with the receipt of the input-output examples (block 1400). As described previously, each input-output example provides one or more input items and a corresponding desired output item. The received input and output items are parsed to produce a weighted set of parses (block 1402). Each of these weighted parses represents a different potential parsing of each input and output item, weighted in accordance with a measure of the likelihood the parsing is a valid parsing based on a comparison to a prescribed library of parses. Next, a previously unselected inputoutput example is selected (block 1404). One or more transforms are identified from a library of transforms of a type that can produce the desired output item from the input items of the selected example (block 1406). In addition, formatting instructions that are capable of formatting an output item so as to match the formatting of the desired output item of the selected input-output example are identified (block 1408). It is then determined if there are any remaining input-output examples that have not been selected (block 1410). If so, then process action of blocks 1404 through 1410 are repeated. When all the input-output examples have been selected and processed, a probabilistic program is generated (block 1412), which given one or more input items of a same type as the input items of the input-output examples, employs the identified transforms and the formatting instructions, to produce an output item corresponding to the one or more input items. One or more input items of the same type as the input items of the input-output examples are then received (block 1414), and an output item corresponding to each received input item is produced using the generated probabilistic program (block 1416).

It is also possible that one or more input items of the same type as the input items of the input-output examples are received in conjunction with receiving the input-output examples. In such a case, the foregoing action of parsing the input items and the output items to produce a weighted set of parses, can include parsing the received input items of the same type as the input items of the input-output examples, as well as the input and output items associated with the input-output examples.

With regard to the action of parsing the input items and the output items to produce a weighted set of parses, it is noted that in one implementation, each input item and output item is a character string, and the library of parses includes a plurality of semantic entities each having an entity class and a collection of fields. Given this, for each character string representing the input and output items and each semantic entity found in the library of parses, a set of field matches is identified where each field match represents the longest sub-string in the input or output item character string that matches a field of a semantic entity from the library of parses. As described previously, a parse graph is constructed from this set of field matches such that a node exists for each character in the character string. In addition, for each field match, a field edge is directed from the node representing the starting character of the field match to the node representing the ending character of the field match. Further, a delimiter edge is established from each node representing a character in the character string and the node representing the next character in the character string. Next, parse paths are identified through the parse graph, where each parse path includes a sequence of nodes that starts with the node representing the first character in the character string and ends with the node representing the last character in the character string, and whose nodes are alternately connected by an edge that alternates between a field edge and a delimiter edge. As such, each identified parse path includes a sequence of semantic entity field and delimiter pairs. Next, a constraint weight factor is computed for each identified parse path. More particularly, each semantic entity is associated with a set of weighted constraints specifying field assignments and ordering between fields or delimiters for the semantic entity with the constraint weight of such a constraint being greater for constraints that are more likely to be exhibited by the semantic entity. Given this, the constraint weight factor is made proportional to the number of constraints associated with the semantic entity under consideration that the parse path satisfies and the constraint weight assigned to each of the satisfied constraints. For example, in one implementation this is done by defining the constraint weight factor to be the ratio of the sum of weights of the constraints that are satisfied by the sum of the weights of all the constraints. Next, a measure of the similarity is computed between the parse path and each of a set of valid parse descriptors which are associated with the semantic entity. In one implementation, this is accomplished by computing a closeness measure that is inversely proportional to the hamming distance between the parse path and a parse descriptor, such that the closer the pattern of semantic entity fields and delimiters in the parse path is to the pattern of semantic entity fields and delimiters in the parse descriptor, the larger the closeness measure. The closeness measure is then designated to be the valid parse descriptor similarity measure for the parse path. Each of these valid parse descriptors includes a sequence of semantic entity field and delimiter pairs that represents a valid parsing of the semantic entity. A weight value for the parse path is then computed based on the constraint weight factor and valid parse descriptor similarity measure computed for the parse path. In one implementation, the weight value is directly proportional to the constraint weight factor, and the higher the similarity measure. For example, it can be chosen to be the product of the two quantities. The parse path is then designated to be a parse descriptor of the semantic entity, and the designated parse descriptor and the computed weight value are associated with the semantic entity to form a weighted semantic entity and parse descriptor tuple. It is noted that in one implementation, the semantic entity of each weighted semantic entity and parse descriptor tuple is converting to a prescribed canonical form of the semantic entity, as described previously. The prescribed canonical form of the semantic entity is identified in the entity class of the entity.

With regard to the action of identifying one or more transforms from a library of transforms of a type that can produce the desired output item from the input items of an input-output example, it is noted that in one implementation, the entity class of each semantic entity identifies one or more transforms that apply to that class of entities. Given this, as described previously, the parse descriptor tuples associated with the input items of the input-output example are identified, along with the parse descriptor tuple associated with the output item of the input-output example. Then, for each of the one or more transforms associated with the classes of the entities in the parse descriptor tuples of the input and output items of the input-output example, identifying the transform which when applied to the semantic entities of the identified parse descriptor tuples associated with the input items produces the entity of the identified parse descriptor tuple associated with the output item. In addition, a weighting factor is computed for the applied transform which represents a measure of how likely it is the desired transform. In general, this weighting factor is computed based on the weight values computed for the parse descriptor tuples of the input items and output item in the input-output example and a measure of the complexity of the transform. More particularly, in one implementation, the weighting factor is computed by first identifying the minimum weight value among 1) the weight values of the parse descriptor tuples associated with the input items of the input-output example to which the transform was applied, and 2) the weight value of the parse descriptor tuple associated the output item of the input-output example to which the transform was applied. Next, an inverse of a size of the applied transform is computed. The product of the identified minimum weight and the computed inverse of the size of the applied transform is computed, and designated as the weighting factor.

It is noted that in some cases, the desired transformation can require the application of more than one transform. In view of this, in an alternate implementation of an action of identifying transforms from a library of transforms of a type that can produce the desired output item from the input items of an input-output example, the following changes to the foregoing process are employed. More particularly, for combinations of the one or more transforms associated with the classes of the entities in the parse descriptor tuples of the input and output items of the input-output example, up to a prescribed number of transformations in the combination, identifying combinations of transforms which when applied to the semantic entities of the identified parse descriptor tuples associated with the input items produce the entity of the identified parse descriptor tuple associated with the output item. In addition, the weighting factor for the applied transform combination is defined as a measure of how likely it is the desired transformation combination.

With regard to the action of identifying formatting instructions which are capable of formatting an output item so as to match the formatting of the desired output item of the input-output example, in general this can entail associating formatting instructions from a library of formatting instructions to each semantic entity field identified in the parse descriptor of the parse descriptor tuple associated with the output item of the input-output example that produce the corresponding field of the semantic entity of that descriptor tuple in the format exhibited by the portion of the output item associated with the semantic entity field. More particularly, in one implementation, this entails first determining whether the semantic entity field is one of a group of prescribed base-type fields for each semantic entity field identified in the parse descriptor of the parse descriptor tuple associated with the output item of the input-output example. Whenever the semantic field is determined to be a base-type field, formatting instructions are associated with that semantic field which have been pre-defined for that type of base-type field. However, whenever a semantic field in the parse descriptor of the parse descriptor tuple associated with the output item of the input-output example is determined not to be a base-type field (i.e., it is an entity type field), formatting instructions are identified by recursively applying the above-mentioned procedure to the entity field.

With regard to the action of generating a probabilistic program which given one or more input items of the same type as the input items of the input-output examples, employs the identified transforms and the formatting instructions, to produce an output item corresponding to the one or more input items, in one implementation this entails the following. For each semantic entity in the parse descriptor tuples of the output items of the input-output examples, a transform, its computed weight factor, and the identified formatting instructions for the semantic entity of the identified parse descriptor tuple associated with the output item are combined to form a parse-compute-print tuple. This is done for each of the one or more transforms associated with the classes of the entities in the parse descriptor tuples of the input items of the input-output examples. Parse-compute-print tuples that have the same transform and the formatting instructions are then identified. For each group of parse-compute-print tuples that have the same transform and the formatting instructions, the group is replaced with a single parse-compute-print tuple having the same transform and the formatting instructions as the group and a weight factor that is the sum of all the weight factors in the group. In addition, parse descriptor tuples of the input items and output items of the input-output examples that have the same parse descriptor are identified. For each group of parse descriptor tuples that have the same parse descriptor, the group is replaced with a single parse descriptor tuple having the same parse descriptor as the group and a weight value that is the sum of all the weight values in the group. The remaining parse descriptor tuples and the parse-compute-print tuples are then combined to form the probabilistic program.

With regard to the action of using the generated probabilistic program to produce an output item corresponding to a received input item, it is noted that in an implementation where the semantic entity of each weighted semantic entity and parse descriptor tuple is converting to a prescribed canonical form, applying a transform will produce a semantic entity also in the canonical form. In view of this, the aforementioned action of identifying formatting instructions that are capable of formatting an output item so as to match the formatting of the desired output item of the input-output example, further includes, if necessary, converting the output item from the prescribed canonical form to a form consistent with the desired output item of the input-output example.

2.8 Illustrative Semantic Entity Manipulation System

Figure 15:
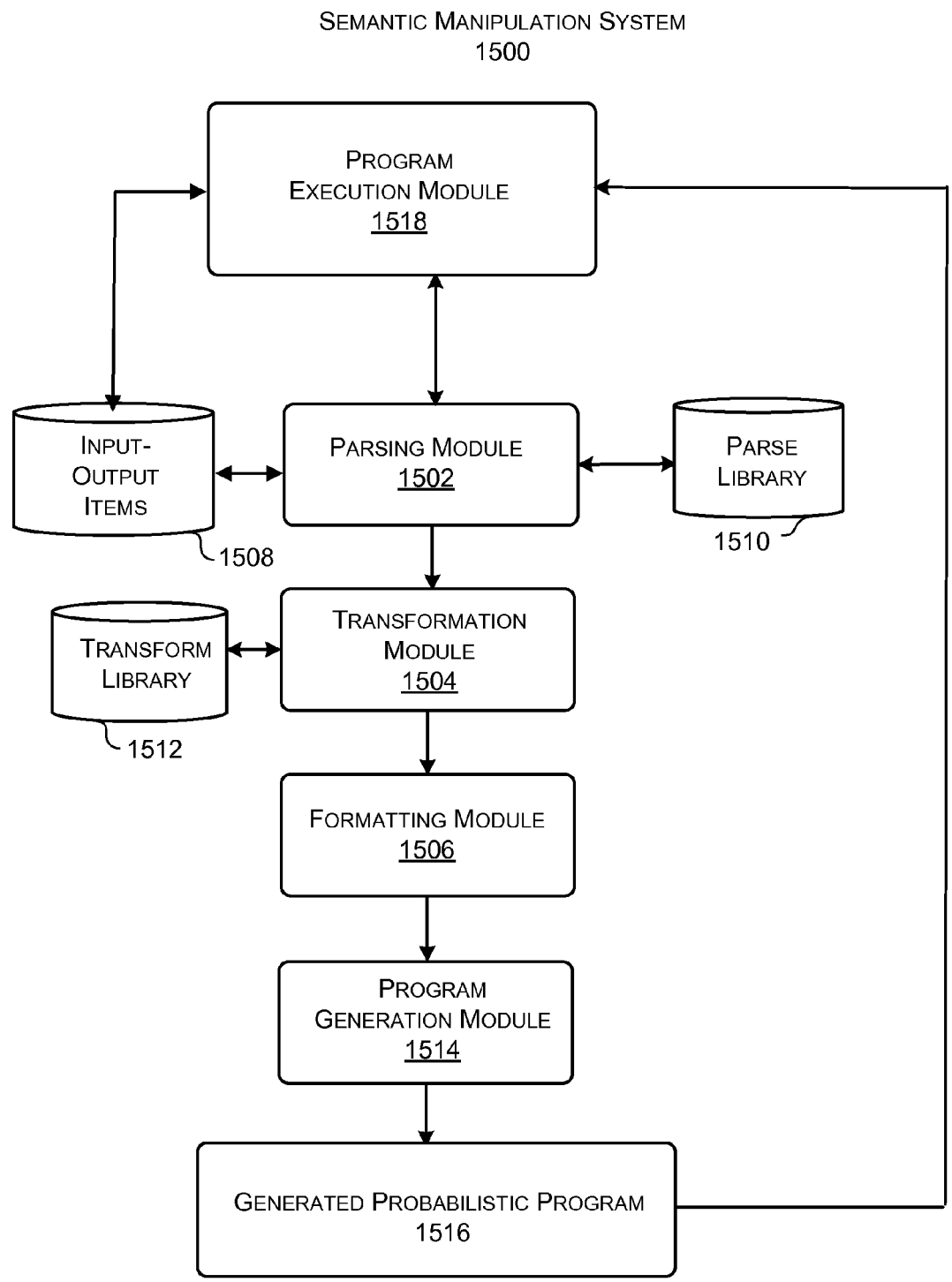
FIG. 15 shows one implementation of a semantic entity manipulation system for realizing the process of FIG. 14.

In further view of the foregoing, one exemplary system for implementing the semantic entity manipulation technique embodiments described herein will now be described. Referring to FIG. 15, the exemplary semantic entity manipulation system 1500 includes a parsing module 1502, a transform module 1504 and a formatting module 1506. The parsing module 1502 parses input items and output items 1508 making up the input-output examples to produce a weighted set of parses. Each of these weighted parses represents a different potential parsing of each input and output item weighted in accordance with a measure of the likelihood the parsing is a valid parsing based on a comparison to a library of parses 1510. The transform module 1504 identifies one or more transforms from a library of transforms 1512 of a type that can produce the desired output item from the input items, for each input-output example. The formatting module 1506 identifies formatting instructions that are capable of formatting an output item so as to match the formatting of the desired output item of an input-output example.

There is also a program generation module 1514 which generates a probabilistic program 1516 that, given one or more input items of a same type as the input items of the input-output examples, employs the identified transforms from the transform module 1504 and the formatting instructions from the formatting module 1506, to produce a set of ranked output items. These output items are ranked in order of a weighting factor computed for them, which represents a measure indicative of how accurately the transform produces the output item from the input items associated with the input-output examples. A program execution module 1518 is used to produce an output item corresponding to a received input item of the same type as the input items of the input-output examples using the generated probabilistic program 1516. One implementation of this program execution module 1518 produces the output item corresponding to the highest ranking output item in the set of ranked output items. When there are more than one output item in the set of ranked output items, the program execution module 1518 produces an indicator indicating that other lower ranking output items were produced and are available for review.

2.9 Illustrative User Interface Operation

This section describes one implementation of a graphical user interface used in conjunction with a spreadsheet program. The user first selects a rectangular region of a spreadsheet containing both input and output columns. This selected region includes one or more input-output examples, as well as non-exemplary inputs for which outputs are desired. The mostly populated columns are treated as input columns, and the less populated columns as output columns. However, in one implementation, the user can also select multiple column ranges and identify explicitly which columns are inputs and which columns are outputs. This is particularly advantageous in cases where most cells in an input column have null entries, since it could be regarded as an output column otherwise. The rows containing entries for an output column are treated as input-output examples for the program to be learned for that output column.

In one implementation, the user selects an "Apply" button (or the like), and the spreadsheet is populated as follows. A semantic entity manipulation program is generated for each output column as described previously. For each output cell $a_{r,c}$ (in row r and output column c), the system runs the learned program for output column c on the input state specified in row r to generate an ranked set O of possible outputs (or possibly just those that have high enough weights). The system populates the cell $a_{r,c}$ as follows:

1) If O contains one string, the system populates the cell with that string;
2) If O contains multiple strings, the system populates the cell with the string representing the top ranked solution, but highlights it to point out to the user that there are multiple computational interpretations of the few examples provided by the user, and that the user may want to investigate the output of the highlighted cell for accuracy; and
3) If O is empty, the system populates the cell with "??" to draw the attention that the user should provide the output for that cell.

The user can then fix contents of any cell by right-clicking on it, wherein a dialog box opens up that allows the user to choose from other strings in the corresponding sequence O, or to provide a new output altogether. After any such fix, the above learning process is automatically repeated with the extended set of input-output examples, and the contents of spreadsheet are automatically updated to reflect the new learned results.

3.0 Exemplary Operating Environments

Figure 16:
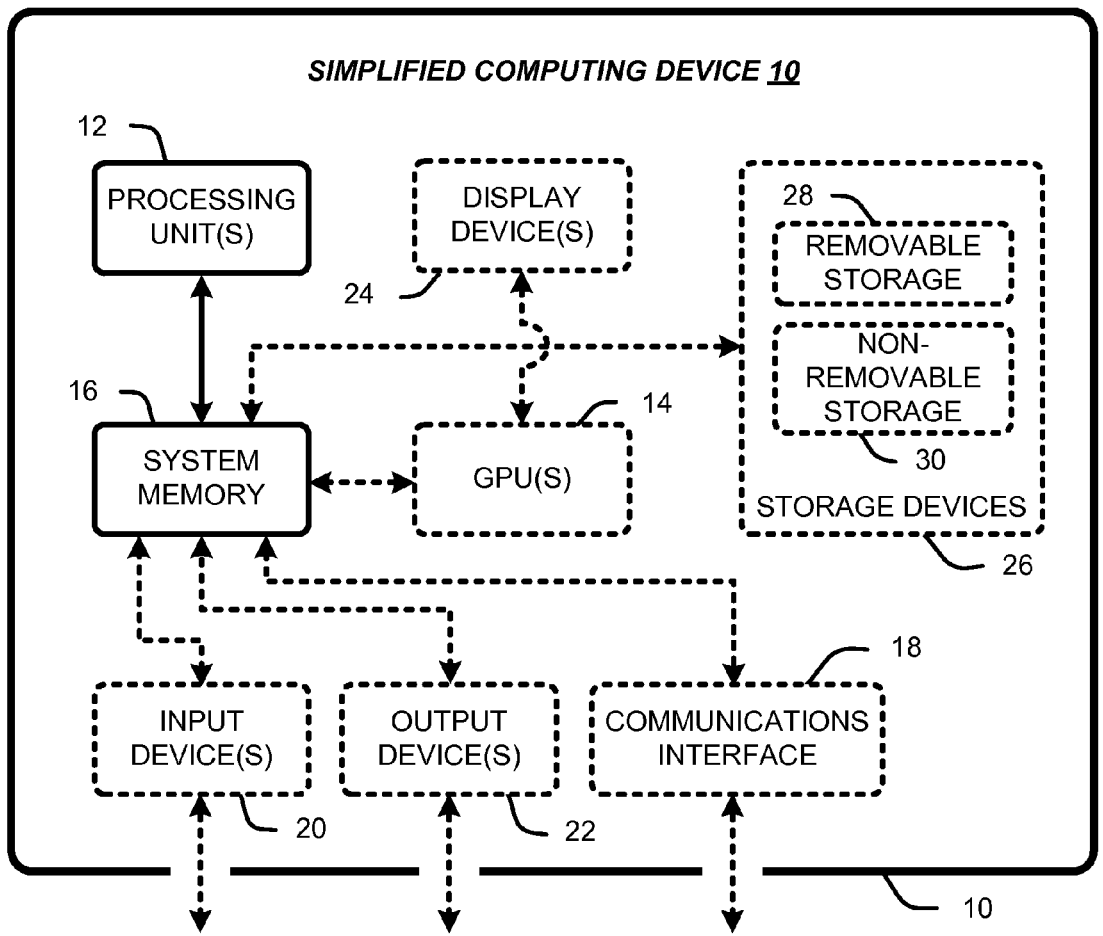
FIG. 16 is a diagram depicting a general purpose computing device constituting an exemplary system for implementing semantic entity manipulation technique embodiments described herein.

The semantic entity manipulation technique embodiments described herein is operational within numerous types of general purpose or special purpose computing system environments or configurations. FIG. 16 illustrates a simplified example of a general-purpose computer system on which various embodiments and elements of the semantic entity manipulation technique embodiments, as described herein, may be implemented. It should be noted that any boxes that are represented by broken or dashed lines in FIG. 16 represent alternate embodiments of the simplified computing device, and that any or all of these alternate embodiments, as described below, may be used in combination with other alternate embodiments that are described throughout this document.

For example, FIG. 16 shows a general system diagram showing a simplified computing device 10. Such computing devices can be typically found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the semantic entity manipulation technique embodiments described herein, the device should have a sufficient computational capability and system memory to enable basic computational operations. In particular, as illustrated by FIG. 16, the computational capability is generally illustrated by one or more processing unit(s) 12, and may also include one or more GPUs 14, either or both in communication with system memory 16. Note that that the processing unit(s) 12 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 16 may also include other components, such as, for example, a communications interface 18. The simplified computing device of FIG. 16 may also include one or more conventional computer input devices 20 (e.g., pointing devices, keyboards, audio input devices, video input devices, haptic input devices, devices for receiving wired or wireless data transmissions, etc.). The simplified computing device of FIG. 16 may also include other optional components, such as, for example, one or more conventional display device(s) 24 and other computer output devices 22 (e.g., audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 16 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves.

Combinations of the any of the above should also be included within the scope of communication media.

Further, software, programs, and/or computer program products embodying the some or all of the various embodiments of the semantic entity manipulation technique described herein, or portions thereof, may be stored, received, transmitted, or read from any desired combination of computer or machine readable media or storage devices and communication media in the form of computer executable instructions or other data structures.

Finally, the semantic entity manipulation technique embodiments described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

4.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for producing a desired output item from one or more input items employing a probabilistic program generated using input-output examples, comprising:
using a computer to perform the following process actions:
receiving input-output examples, each input-output example providing one or more input items and a corresponding desired output item;
parsing the input items and the output items to produce a weighted set of parses, each weighted parse representing a different potential parsing of each input and output item weighted in accordance with a measure of the likelihood the parsing is a valid parsing based on a comparison to a library of parses;
for each input-output example,
identifying one or more transforms from a library of transforms of a type that can produce the desired output item from the input items, and
identifying formatting instructions which are capable of formatting an output item so as to match the formatting of the desired output item of the input-output example;
generating a probabilistic program which given one or more input items of the same type as the input items of the input-output examples, employs the identified transforms and the formatting instructions, to produce an output item corresponding to the one or more input items; and
receiving one or more input items of the same type as the input items of the input-output examples, and producing an output item corresponding to the received input item using the generated probabilistic program.

2. The process of claim 1, wherein each input item and output item comprises a character string, and wherein the library of parses comprises a plurality of semantic entities each comprising an entity class and a collection of fields, and wherein the process action of parsing the input items and the output items to produce a weighted set of parses, comprises the actions of:
for each character string representing the input and output items and each semantic entity found in the library of parses,
identifying a set of field matches wherein each field match comprising the longest sub-string in the input or output item character string that matches a field of a semantic entity from the library of parses,
constructing a parse graph from the set of field matches such that a node exists for each character in the character string, and for each field match a field edge is directed from the node representing the starting character of the field match to the node representing the ending character of the field match, and a delimiter edge is established from each node representing a character in the character string and a node representing any next character in the character string,
identifying parse paths through the parse graph, wherein each parse path comprises a sequence of nodes that starts with the node representing the first character in the character string and ends with the node representing the last character in the character string, and whose nodes are alternately connected by an edge that alternates between a field edge and a delimiter edge, such that each identified parse path comprises a sequence of semantic entity field and delimiter pairs, and
for each parse path identified,
computing a constraint weight factor for each identified parse path which is proportional to the number of constraints associated with the semantic entity under consideration that the parse path satisfies and the constraint weight assigned to each of the satisfied constraints, wherein each semantic entity is associated with a set of weighted constraints specifying field assignments and ordering between fields or delimiters for the semantic entity with the constraint weight of such a constraint being greater for constraints that are more likely to be exhibited by the semantic entity,
computing a measure of the similarity between the parse path and each of a set of valid parse descriptors which are associated with the semantic entity, wherein each of the valid parse descriptors comprises a sequence of semantic entity field and delimiter pairs that represents a valid parsing of the semantic entity,
computing a weight value for the parse path based on the constraint weight factor and valid parse descriptor similarity measure computed for the parse path, and
designating the parse path to be a designated parse descriptor of the semantic entity and associating the designated parse descriptor and the computed weight value with the semantic entity to form a weighted semantic entity and parse descriptor tuple.

3. The process of claim 2, further comprising a process action of, for each weighted semantic entity and parse descriptor tuple, converting the semantic entity to a prescribed canonical form of the semantic entity.

4. The process of claim 2, wherein the process action of computing the measure of the similarity between an identified parse path and a parse descriptors, comprises the actions of:
computing a closeness measure that is inversely proportional to the hamming distance between the parse path and the parse descriptor, such that the closer the pattern of semantic entity fields and delimiters in the parse path is to the pattern of semantic entity fields and delimiters in the parse descriptor, the larger the closeness measure; and
designating the closeness measure to be the valid parse descriptor similarity measure for the parse path.

5. The process of claim 2, wherein the process action of computing a constraint weight factor for each identified parse path which is proportional to the number of constraints associated with the semantic entity under consideration that the parse path satisfies and the constraint weight assigned to each of the satisfied constraints, comprises an action of taking the ratio of the sum of the weights of the constraints that are satisfied by the weight of all constraints.

6. The process of claim 2, wherein the process action of computing the weight value for the parse path based on the constraint weight factor and valid parse descriptor similarity measure computed for the parse path, comprises an action of taking the product of the constraint weight factor and the similarity measure.

7. The process of claim 2, wherein the entity class of each semantic entity identifies one or more transforms that apply to that class of entities, and wherein the process action of, for each input-output example, identifying one or more transforms from a library of transforms of a type that can produce the desired output item from the input items, comprises the actions of:
identifying the parse descriptor tuples associated with the input items of the input-output example;
identifying the parse descriptor tuple associated with the output item of the input-output example; and
for each of the one or more transforms associated with the classes of the entities in the parse descriptor tuples of the input and output items of the input-output example,
identifying those transforms that when applied to the semantic entities of the identified parse descriptor tuples associated with the input items produce the entity of the identified parse descriptor tuple associated with the output item, and
computing a weighting factor for each such transform, where the weighting factor is a measure of the likelihood of the transform being the desired one.

8. The process of claim 7, wherein the process action of identifying formatting instructions which are capable of formatting an output item so as to match the formatting of the desired output item of the input-output example, comprises an action of associating formatting instructions from a library of formatting instructions, for each semantic entity field identified in the parse descriptor of the parse descriptor tuple associated with the output item of the input-output example, which produces the corresponding field of the semantic entity of that descriptor tuple in the format exhibited by the portion of the output item associated with the semantic entity field.

9. The process of claim 8, wherein the process action of generating a probabilistic program which given one or more input items of the same type as the input items of the input-output examples, employs the identified transforms and the formatting instructions, to produce an output item corresponding to the one or more input items, comprises the actions of:
for each semantic entity in the parse descriptor tuples of the output items of the input-output examples,
associating the transform, its computed weight factor, and the identified formatting instructions for the semantic entity of the identified parse descriptor tuple associated with the output item to form a parse-compute-print tuple, for each of the one or more transforms associated with the classes of the entities in the parse descriptor tuples of the input items of the input-output examples;
identifying parse-compute-print tuples that have the same transform and the formatting instructions;
for each group of parse-compute-print tuples that have the same transform and the formatting instructions, replacing the group with a single parse-compute-print tuple having the same transform and the formatting instructions as the group and in which the weight factor is the sum of all the weight factors in the group;
identifying parse descriptor tuples of the input items and output items of the input-output examples that have the same parse descriptor;
for each group of parse descriptor tuples that have the same parse descriptor, replacing the group with a single parse descriptor tuple having the same parse descriptor as the group and in which the weight value is the sum of all the weight values in the group; and
grouping the remaining parse descriptor tuples and the parse-compute-print tuples to form the probabilistic program.

10. The process of claim 8, wherein the entity class of each semantic entity identifies a prescribed canonical form of the semantic entity, said process further comprising a process actions of, for each weighted semantic entity and parse descriptor tuple, converting the semantic entity to the prescribed canonical form of the semantic entity, and wherein the process action of applying the transform to the semantic entities of the identified parse descriptor tuples associated with the input items to produce the entity of the identified parse descriptor tuple associated with the output item, comprises an action of producing the entity of the identified parse descriptor tuple associated with the output item in the prescribed canonical form, and wherein the process action of identifying formatting instructions which are capable of formatting an output item so as to match the formatting of the desired output item of the input-output example, further comprises an action of converting the output item from the prescribed canonical form to a form consistent with the desired output item of the input-output example.

11. The process of claim 7, wherein the process action of computing the weighting factor for the identified transform, comprises an action of computing the weighting factor based on the weight values computed for the parse descriptor tuples of the input items and output item in the input-output example and a measure of the complexity of the transform.

12. The process of claim 7, wherein the process action of computing the weighting factor for the applied transform, comprises the actions of:
identifying the minimum weight value among the weight values of the parse descriptor tuples associated with the input items of the input-output example for which the transform was identified and the weight value of the parse descriptor tuple associated the output item of the input-output example for which the transform was identified;

computing an inverse of a size of the applied transform;

computing the product of the identified minimum weight and the computed inverse of the size of the applied transform;

designating the computed product to be the weighting factor.

13. The process of claim 7, wherein the process action of identifying formatting instructions which are capable of formatting an output item so as to match the formatting of the desired output item of the input-output example, comprises the process actions of:

for each semantic entity field identified in the parse descriptor of the parse descriptor tuple associated with the output item of the input-output example, determining whether the semantic entity field is one of a group of prescribed base-type fields;

whenever a semantic field in the parse descriptor of the parse descriptor tuple associated with the output item of the input-output example is determined to be a base-type field, associating formatting instructions with that semantic field which have been pre-defined for that type of base-type field;

whenever a semantic field in the parse descriptor of the parse descriptor tuple associated with the output item of the input-output example is determined not to be a base-type field, associating formatting instructions which produce the corresponding field of the semantic entity of that descriptor tuple in the format exhibited by the portion of the output item associated with the semantic entity field.

14. The process of claim 2, wherein the entity class of each semantic entity identifies one or more transforms that apply to that class of entities, and wherein the process action of, for each input-output example, identifying one or more transforms from a library of transforms of a type that can produce the desired output item from the input items, comprises the actions of:

identifying the parse descriptor tuples associated with the input items of the input-output example;

identifying the parse descriptor tuple associated with the output item of the input-output example; and for combinations of the one or more transforms associated with the classes of the entities in the parse descriptor tuples of the input and output items of the input-output example, up to a prescribed number of transformations in the combination, identifying those combinations of transforms that when applied to the semantic entities of the identified parse descriptor tuples associated with the input items produce the entity of the identified parse descriptor tuple associated with the output item, and computing a weighting factor for each identified transform combination comprising a measure of the likelihood of the transform combination being the desired one.

15. The process of claim 1, wherein the one or more input items of the same type as the input items of the input-output examples are received in conjunction with receiving the input-output examples, and wherein the process action of parsing the input items and the output items to produce a weighted set of parses, comprises an action of parsing the input and output items associated with the input-output examples, as well as the received input items of the same type as the input items of the input-output examples.

16. The process of claim 15, wherein input-output examples and the one or more input items of the same type as the input items of the input-output examples comprise spreadsheet data.

17. A system for producing a desired output item from one or more input items employing a probabilistic program generated using input-output examples, comprising:

a computing device; and a computer program comprising program modules executed by the computing device, said program modules comprising, a parsing module which parses input items and output items making up said input-output examples to produce a weighted set of parses, each weighted parse representing a different potential parsing of each input and output item weighted in accordance with a measure of the likelihood the parsing is a valid parsing based on a comparison to a library of parses, a transform module which, for each input-output example, identifies one or more transforms from a library of transforms of a type that can produce the desired output item from the input items, and a formatting module which identifies formatting instructions that are capable of formatting an output item so as to match the formatting of the desired output item of an input-output example;

a program generation module which generates a probabilistic program that given one or more input items of a same type as the input items of the input-output examples, employs the identified transforms and the formatting instructions, to produce a set of ranked output items, wherein the output items are ranked in order of a weighting factor computed therefor comprising a measure indicative of how accurately the transform produces the output item from the input items associated with the input-output examples, and a program execution module which produces an output item corresponding to a received input item of the same type as the input items of the input-output examples using the generated probabilistic program.

18. The system of claim 17, wherein the program execution module produces the output item corresponding to the highest ranking output item in the set of ranked output items, and whenever there are more than one output item in the set of ranked output items, the program execution module further produces an indicator indicating that other lower ranking output items were produced and are available for review.

19. A computer-readable storage medium for storing computer readable instructions, the computer-readable instructions providing a probabilistic program generation system which produces a desired output item from one or more input items using input-output examples when executed by one or more processing devices, the computer-readable instructions comprising:

parsing logic configured to receive input-output examples, each input-output example providing one or more input items and a corresponding desired output item, and to parse the input items and the output items to produce a weighted set of parses, each weighted parse representing a different potential parsing of each input and output item weighted in accordance with a measure of the likelihood the parsing is a valid parsing based on a comparison to a library of parses;

transformation logic configured to, for each input-output example, identify one or more transforms of a type that can produce the desired output item from the input items;

formatting logic configured to identify formatting instructions which are capable of formatting an output item so as to match the formatting of the desired output item of a input-output example;

generating logic configured to generate a probabilistic program which given one or more input items of a same type as the input items of the input-output examples, employs the identified transforms and the formatting instructions, to produce an output item corresponding to the one or more input items; and execution logic configured to receive one or more input items of the same type as the input items of the input-output examples, and produce an output item corresponding to the received input item using the generated probabilistic program.

20. The computer-readable storage medium of claim 19, wherein the transformation logic identifies transforms that apply at least one of arithmetic computations, or round-off computations, or lookup table computations, or computer network-based computations, to the input items to produce the desired output item.

* * * * *